United States Patent
Arunachalam et al.

(10) Patent No.: US 11,290,487 B2
(45) Date of Patent: Mar. 29, 2022

(54) METHOD AND APPARATUS FOR REDUCING LATENCY OF NETWORK PROTOCOLS

(71) Applicant: Samsung Electronics Co., Ltd, Suwon-si (KR)

(72) Inventors: Karthikeyan Arunachalam, Bangalore (IN); Jamsheed Manja Ppallan, Bangalore (IN); Dronamraju Siva Sabareesh, Bangalore (IN); Sung-Ki Suh, Hwaseong-si (KR); Tae-Wan Kim, Suwon-si (KR); Karthikeyan Subramaniam, Bangalore (IN); Kannan Govindan, Bangalore (IN); Rohit Shankar Lingappa, Bangalore (IN); Sweta Jaiswal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 16/603,558

(22) PCT Filed: Apr. 6, 2018

(86) PCT No.: PCT/KR2018/004106
§ 371 (c)(1),
(2) Date: Oct. 7, 2019

(87) PCT Pub. No.: WO2018/186718
PCT Pub. Date: Oct. 11, 2018

(65) Prior Publication Data
US 2020/0236139 A1  Jul. 23, 2020

(30) Foreign Application Priority Data

Apr. 7, 2017 (IN) .............................. 201741012683
Apr. 4, 2018 (IN) .............................. 201741012683

(51) Int. Cl.
*H04L 29/06* (2006.01)
*H04L 61/4511* (2022.01)
(Continued)

(52) U.S. Cl.
CPC ........ *H04L 63/166* (2013.01); *H04L 61/1511* (2013.01); *H04L 63/0236* (2013.01);
(Continued)

(58) Field of Classification Search
CPC ............... H04L 63/166; H04L 43/0876; H04L 29/0881; H04L 67/2847; H04L 29/12066;
(Continued)

(56) References Cited

U.S. PATENT DOCUMENTS 7,152,118 B2 * 12/2006 Anderson, IV ... H04L 29/12216
709/245
7,343,397 B2 * 3/2008 Kochanski ............. G06Q 30/06
709/203
(Continued)

FOREIGN PATENT DOCUMENTS

EP         1343296 B1 *  5/2011  ......... H04L 61/2015
KR    20180024003 A  *  3/2018  ............. H04L 67/16
(Continued)

OTHER PUBLICATIONS

Cohen et al., "Prefetching the Means for Document Transfer: A New Approach for Reducing Web Latency", 2000 (Year: 2000).*
(Continued)

*Primary Examiner* — Ondrej C Vostal

(57) ABSTRACT

The embodiments herein disclose methods and systems for reducing network protocol latency for at least one application on an electronic device, a method includes pre-resolving a plurality of Domain Name System (DNS) queries for the at least one application. The plurality of DNS queries is pre-resolved before triggering at least one DNS resolution
(Continued)

query from the at least one application. The method includes pre-connecting a plurality of TCP connections of the at least one application with at least one Transmission Control Protocol (TCP) server. The plurality of TCP connections are pre-connected before triggering at least one TCP connection request from the at least one application. The method includes exchanging a plurality of secure certificates with the at least one TCP server to secure the plurality of pre-connected TCP connections. The secure certificates are exchanged before receiving at least one request from the at least one application for secure certificate negotiation.

11 Claims, 23 Drawing Sheets

(51) Int. Cl.
  *H04L 67/141* (2022.01)
  *H04L 69/16* (2022.01)
(52) U.S. Cl.
  CPC ........ *H04L 63/0823* (2013.01); *H04L 63/205* (2013.01); *H04L 67/141* (2013.01); *H04L 69/16* (2013.01)
(58) Field of Classification Search
  CPC .......... H04L 61/1511; H04L 29/08288; H04N 21/6587; G06F 15/16
  See application file for complete search history.

(56) References Cited

U.S. PATENT DOCUMENTS

| | | | |
|---|---|---|---|
| 8,280,946 B1* | 10/2012 | Badros ................. | G06F 16/951 709/203 |
| 8,645,501 B2* | 2/2014 | Ghosh ................. | H04L 61/6009 709/219 |
| 8,903,946 B1* | 12/2014 | Roskind .............. | G06F 16/9566 709/217 |
| 9,215,205 B1* | 12/2015 | Smith ................. | H04L 61/1511 |
| 9,465,777 B2* | 10/2016 | Mir ....................... | G06F 40/134 |
| 9,565,258 B1 | 2/2017 | Roskind et al. | |
| 2004/0205149 A1* | 10/2004 | Dillon .................. | H04L 65/105 709/217 |
| 2004/0258053 A1* | 12/2004 | Toporek ............... | H04B 7/2126 370/352 |
| 2005/0240574 A1* | 10/2005 | Challenger ......... | G06F 16/9574 |
| 2005/0262248 A1* | 11/2005 | Jennings, III ....... | H04L 67/2847 709/228 |
| 2006/0155984 A1* | 7/2006 | Tsuchida ............. | H04L 69/165 713/156 |
| 2008/0228938 A1* | 9/2008 | Plamondon ......... | H04L 67/02 709/233 |
| 2009/0106830 A1* | 4/2009 | Maher .................. | H04L 63/166 726/12 |
| 2010/0057936 A1* | 3/2010 | Roskind .............. | H04L 67/02 709/245 |
| 2010/0191856 A1* | 7/2010 | Gupta ................. | H04L 29/12066 709/228 |
| 2011/0188407 A1* | 8/2011 | Aboughanaima ... | H04L 61/1511 370/254 |
| 2012/0084343 A1* | 4/2012 | Mir ....................... | G06F 40/134 709/203 |
| 2012/0254996 A1* | 10/2012 | Wilbourn ............ | H04L 61/6009 726/22 |
| 2012/0324094 A1* | 12/2012 | Wyatt ................. | H04L 43/0876 709/224 |
| 2013/0283041 A1* | 10/2013 | Vajirkar .............. | H04L 61/1511 713/156 |
| 2014/0156780 A1* | 6/2014 | Roskind .............. | H04L 61/6009 709/214 |
| 2014/0173134 A1* | 6/2014 | Choquette ........... | H04L 61/6013 709/245 |
| 2014/0258346 A1* | 9/2014 | Meltzer ................ | G06F 16/16 707/822 |
| 2014/0359081 A1* | 12/2014 | Van Deventer .... | H04N 21/6587 709/219 |
| 2015/0019708 A1* | 1/2015 | Denis .................... | H04L 61/103 709/224 |
| 2015/0067819 A1* | 3/2015 | Shribman ........... | H04L 65/4084 726/12 |
| 2015/0195243 A1* | 7/2015 | Roskind .............. | H04L 61/1511 709/213 |
| 2015/0256642 A1* | 9/2015 | Roskind .............. | G06F 16/9566 709/213 |
| 2015/0350370 A1* | 12/2015 | Lepeska ............... | G06F 16/957 709/219 |
| 2017/0202004 A1* | 7/2017 | Hurd .................. | H04W 28/0278 |
| 2017/0339130 A1* | 11/2017 | Reddy .................. | H04L 69/326 |
| 2017/0374017 A1* | 12/2017 | Gautam .............. | H04L 67/2804 |

FOREIGN PATENT DOCUMENTS

| | | | | | |
|---|---|---|---|---|---|
| WO | | WO-0027092 A1 | * | 5/2000 | ............. H04L 29/06 |
| WO | | WO-2016074148 A1 | * | 5/2016 | .......... H04L 61/1511 |

OTHER PUBLICATIONS

Cohen et al., "Proactive Caching of DNS Records: Addressing a Performance Bottleneck", 2001 (Year: 2001).*
Ferreira et al., "Hint-Driven DNS Resolution", 2011 (Year: 2011).*
Fujiwara et al., "DNS traffic analysis—Issues of IPv6 and CDN—", 2012 (Year: 2012).*
Jin et al., "Design and Implementation of Secure Prefetch Mechanism for Multi-step Resolution in DNS", 2016 (Year: 2016).*
Choi et al., "BotGAD: Detecting Botnets by Capturing Group Activities in Network Traffic", 2009 (Year: 2009).*
Gunes et al., "What is the Reaction of ISPs to Active Probing?", 2008 (Year: 2008).*
Kwon et al., "PsyBoG: Power Spectral Density Analysis for Detecting Botnet Groups", 2014 (Year: 2014).*
Shavitt et al., "A Geolocation Databases Study", 2011 (Year: 2011).*
Spring et al., "Measuring ISP Topologies with Rocketfuel", 2002 (Year: 2002).*
International Search Report dated Jul. 4, 2018 in connection with International Patent Application No. PCT/KR2018/004106, 3 pages.
Written Opinion of the International Searching Authority dated Jul. 4, 2018 in connection with International Patent Application No. PCT/KR2018/004106, 8 pages.

* cited by examiner

[Fig. 1a]
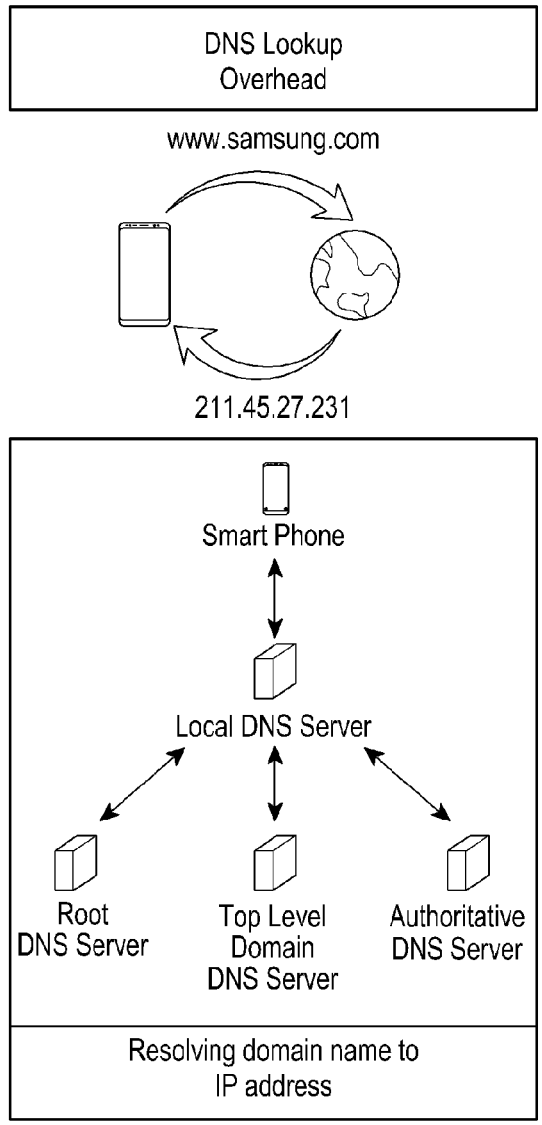

[Fig. 1b]
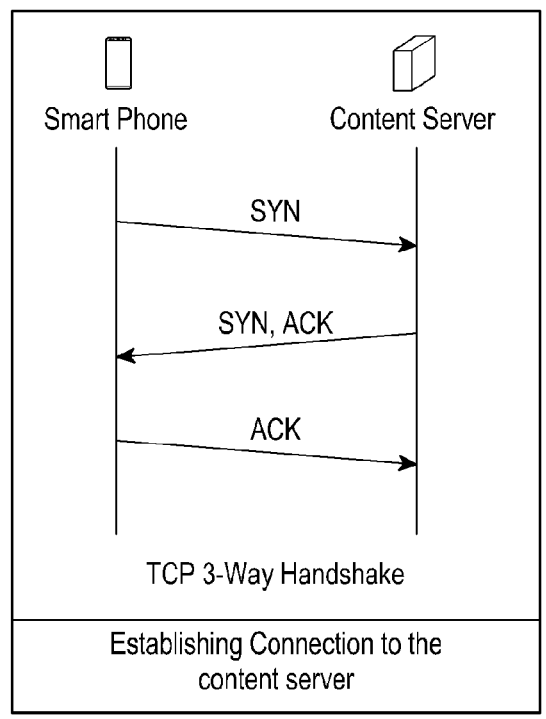

[Fig. 1c]
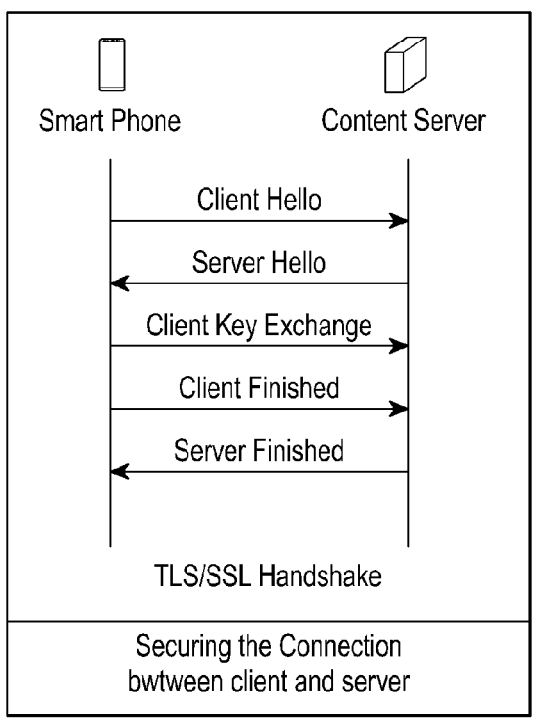
[Fig. 1d]
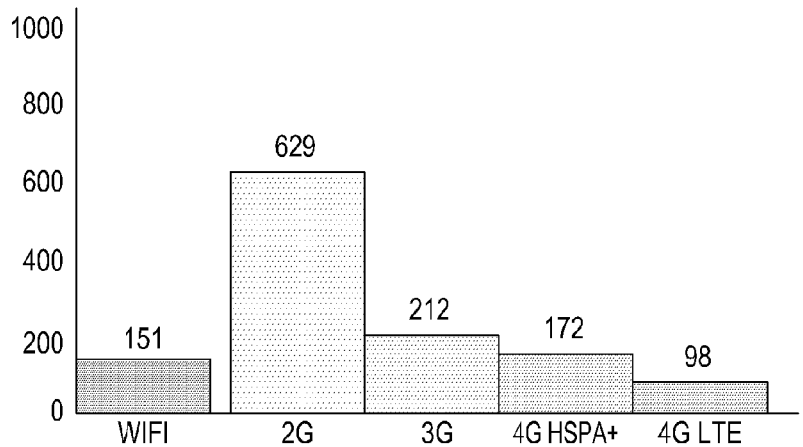

[Fig. 1e]
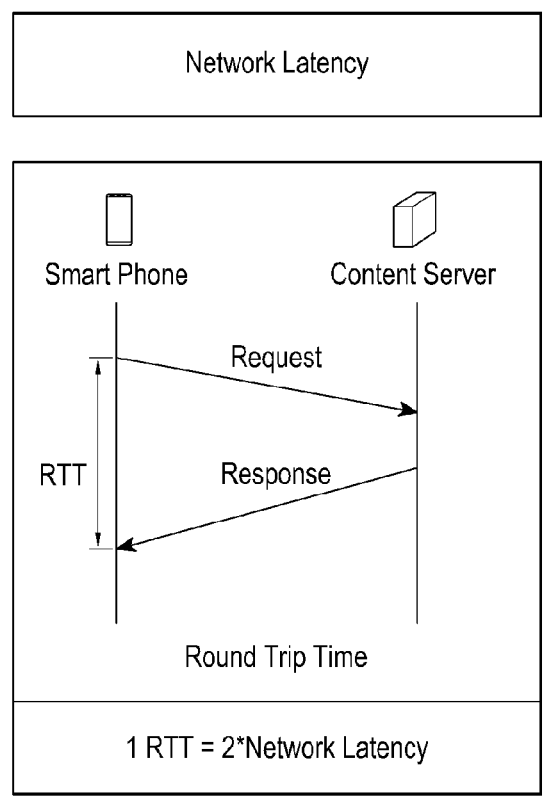

[Fig. 2]
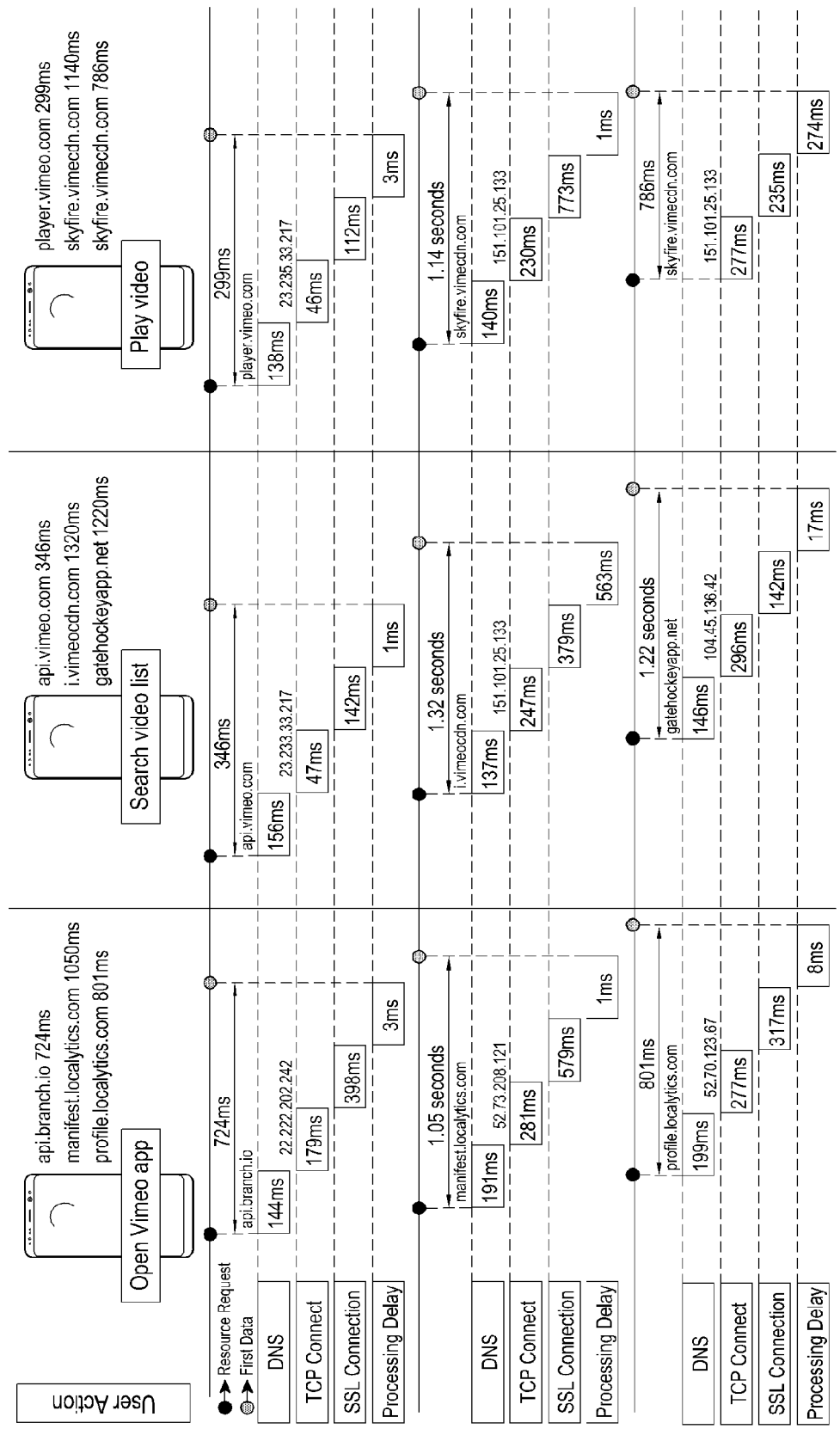

[Fig. 3]
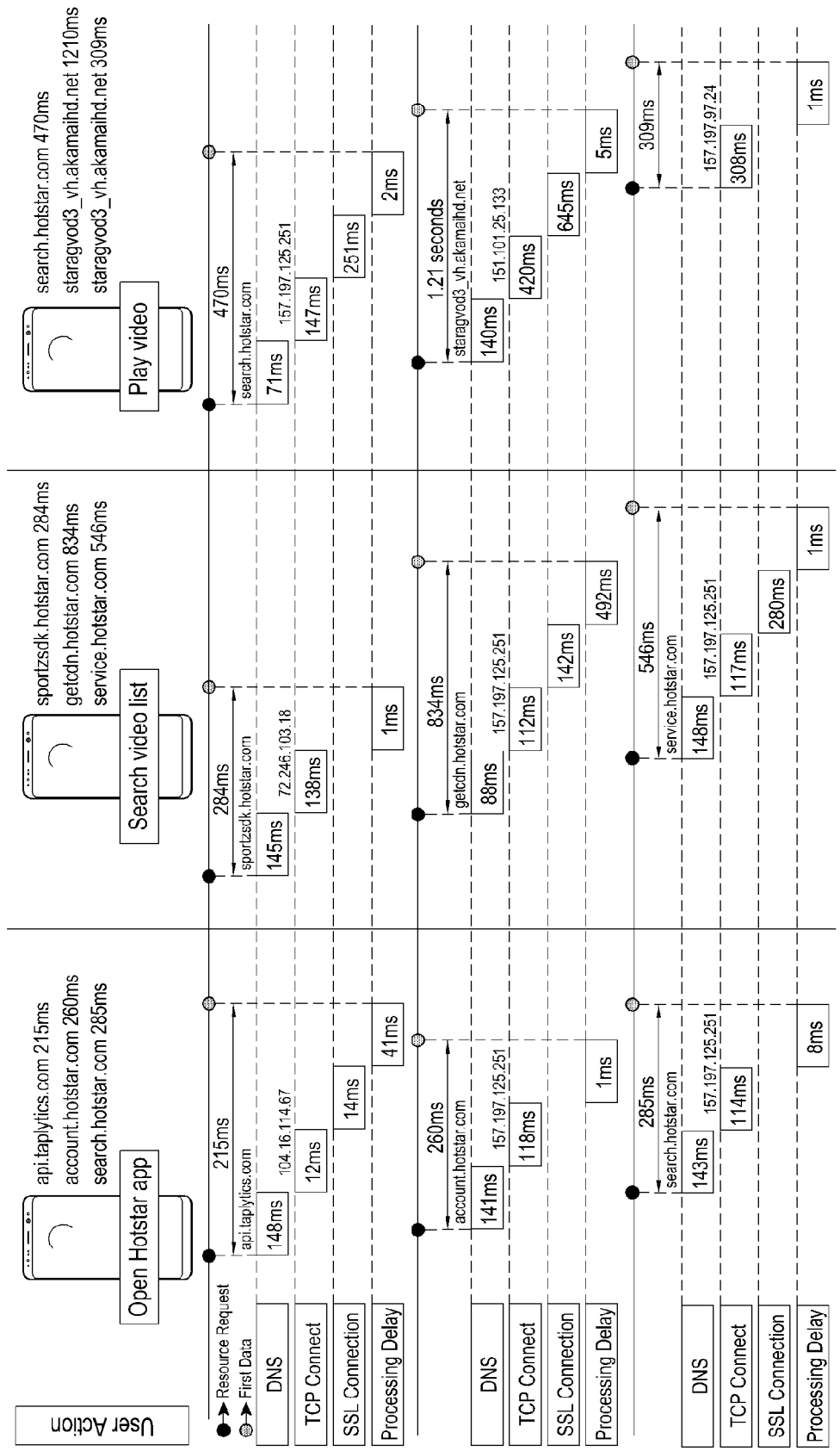

[Fig. 4]
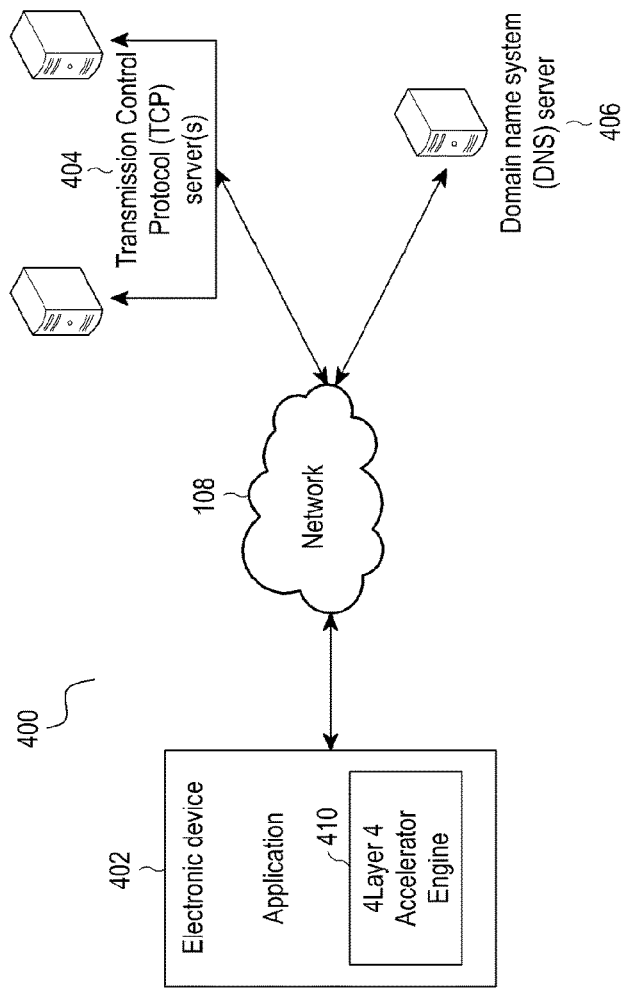
[Fig. 5]
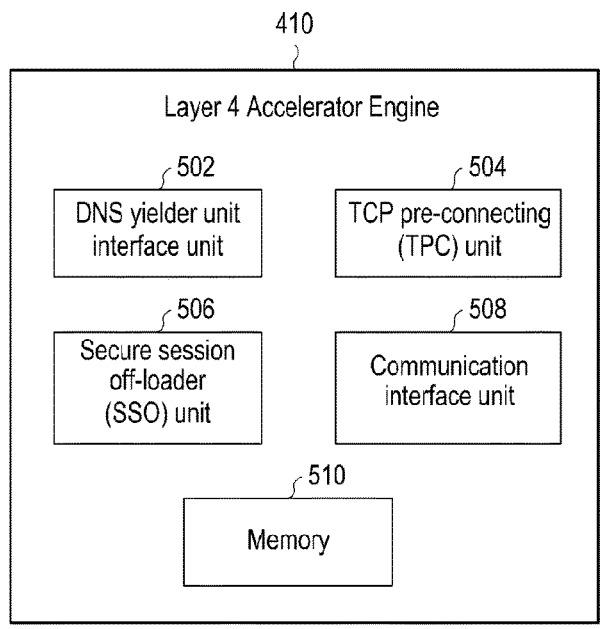

[Fig. 6]
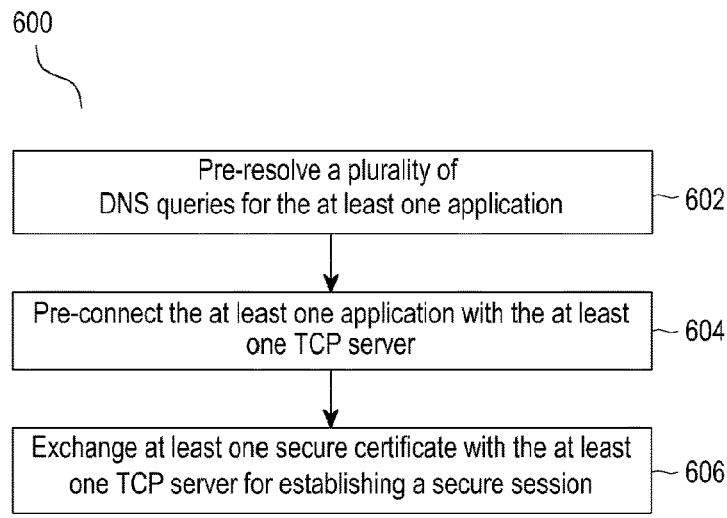
[Fig. 7]
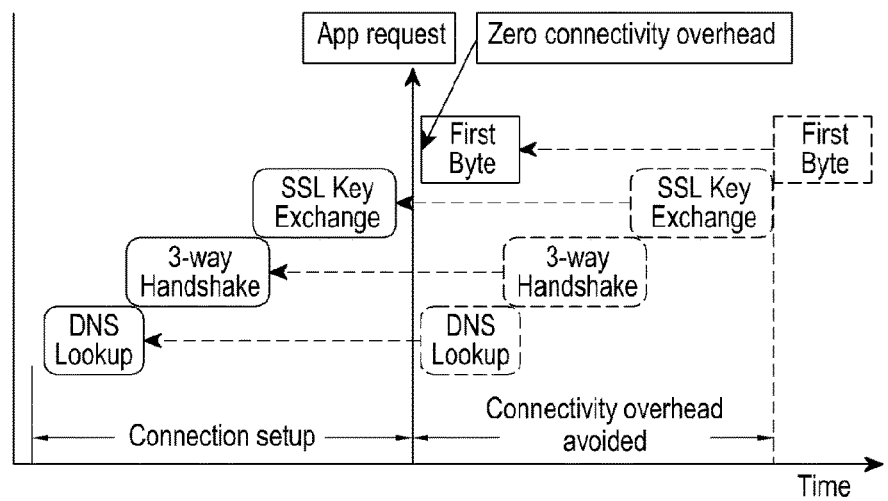
[Fig. 8]
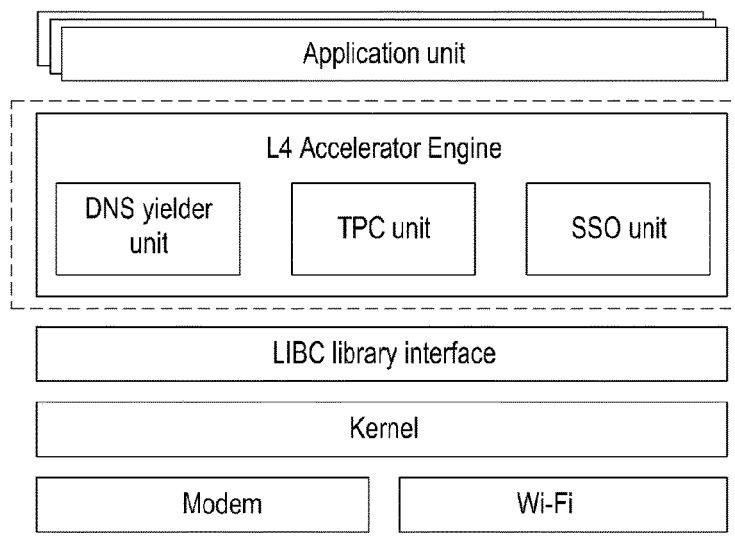

[Fig. 9a]
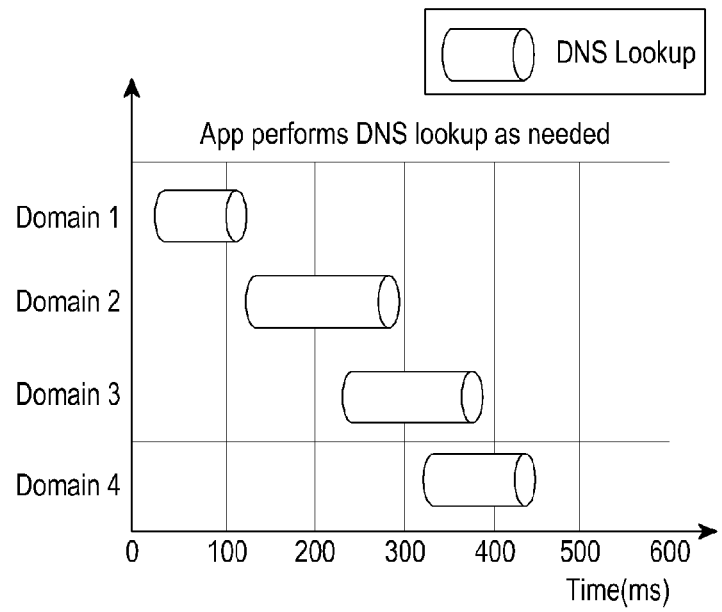
[Fig. 9b]
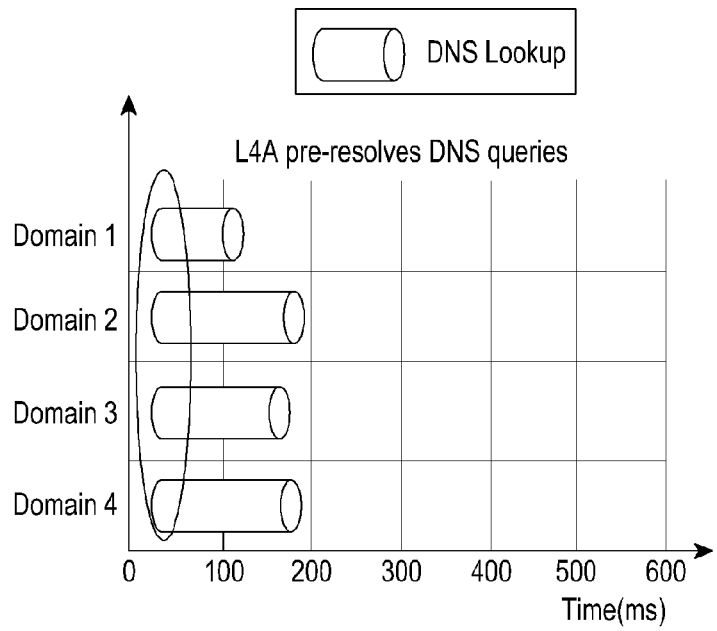

[Fig. 10a]
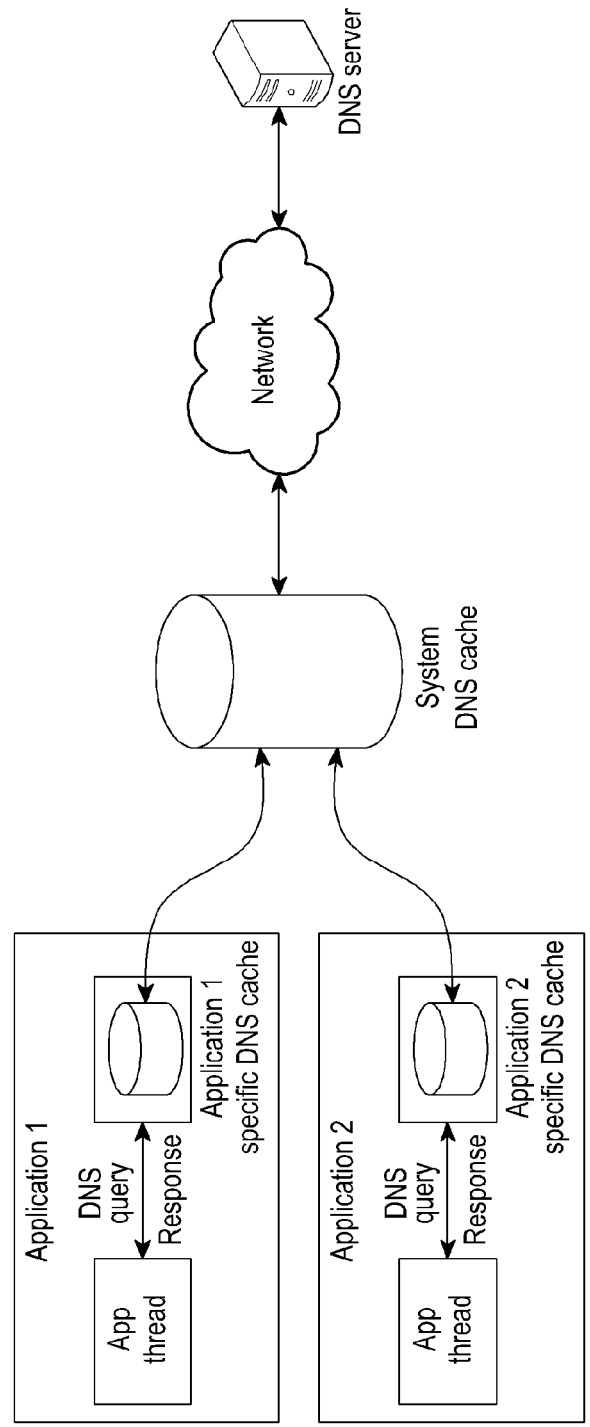

[Fig. 10b]
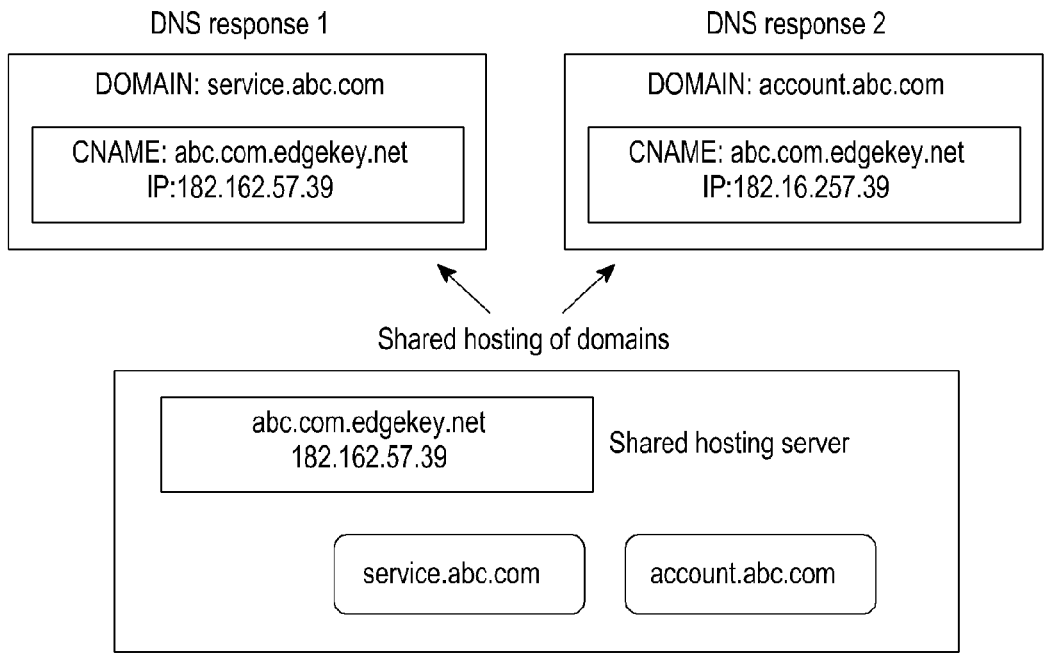
[Fig. 11a]
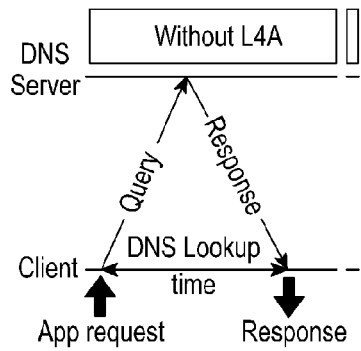
[Fig. 11b]
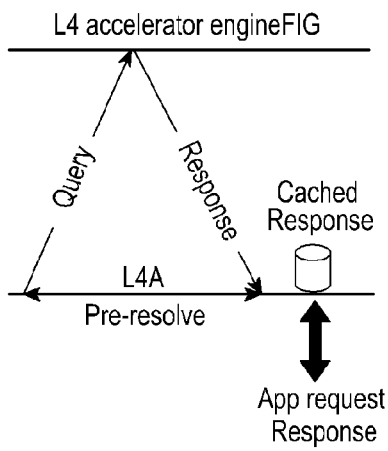

[Fig. 11c]
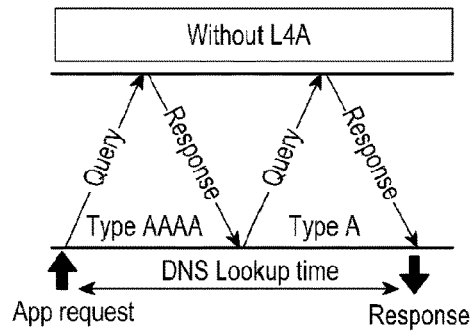
[Fig. 11d]
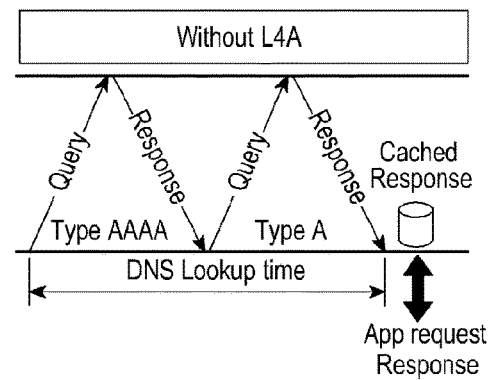
[Fig. 11e]
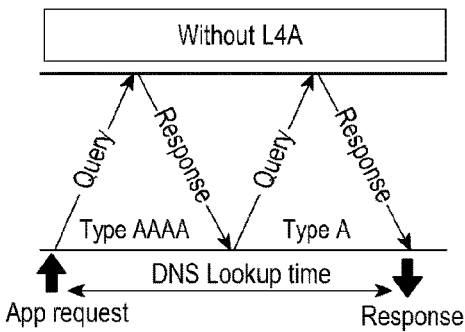
[Fig. 11f]
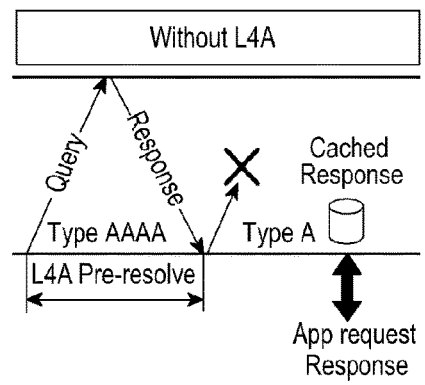

[Fig. 12]
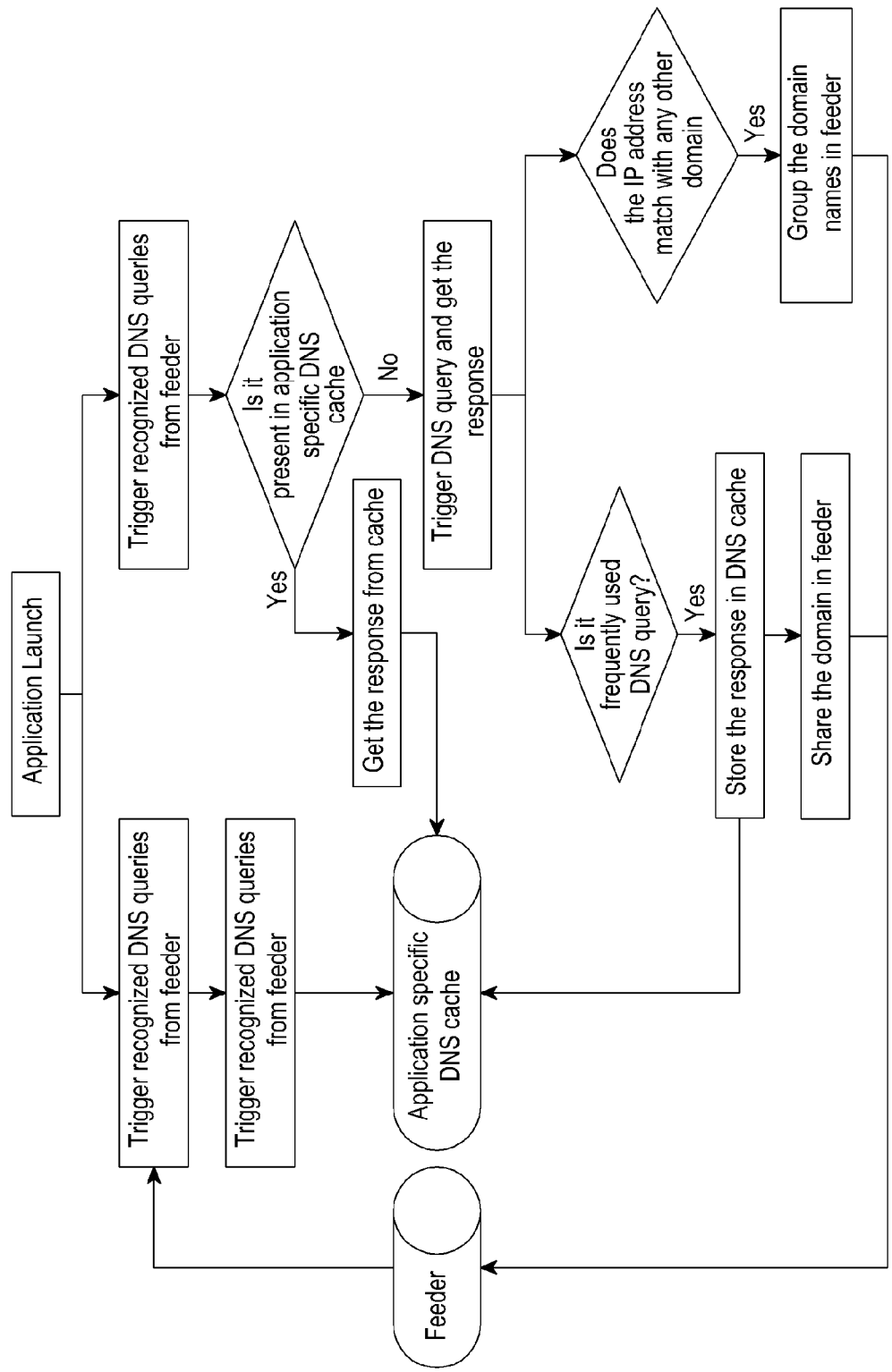

[Fig. 13a]
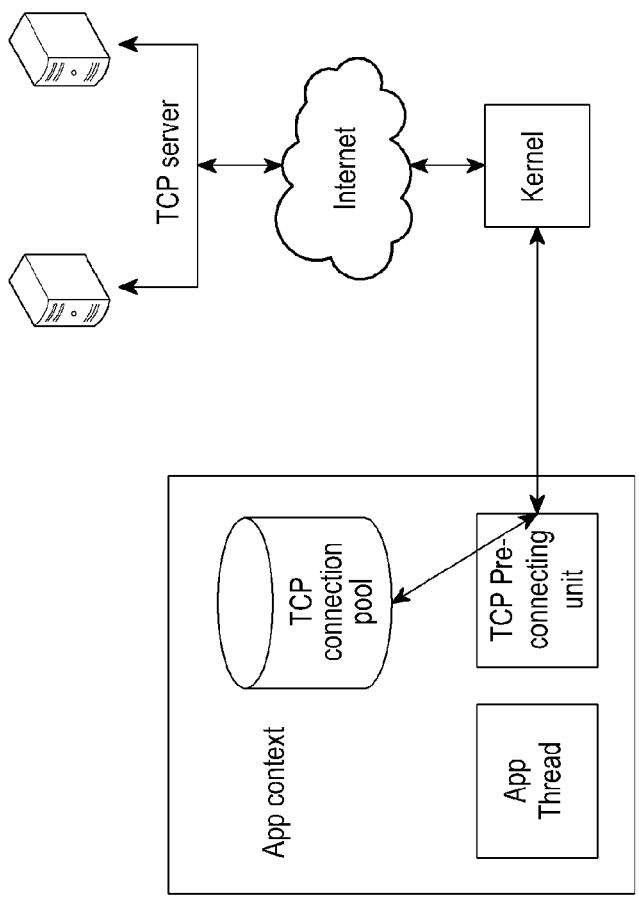

[Fig. 13b]
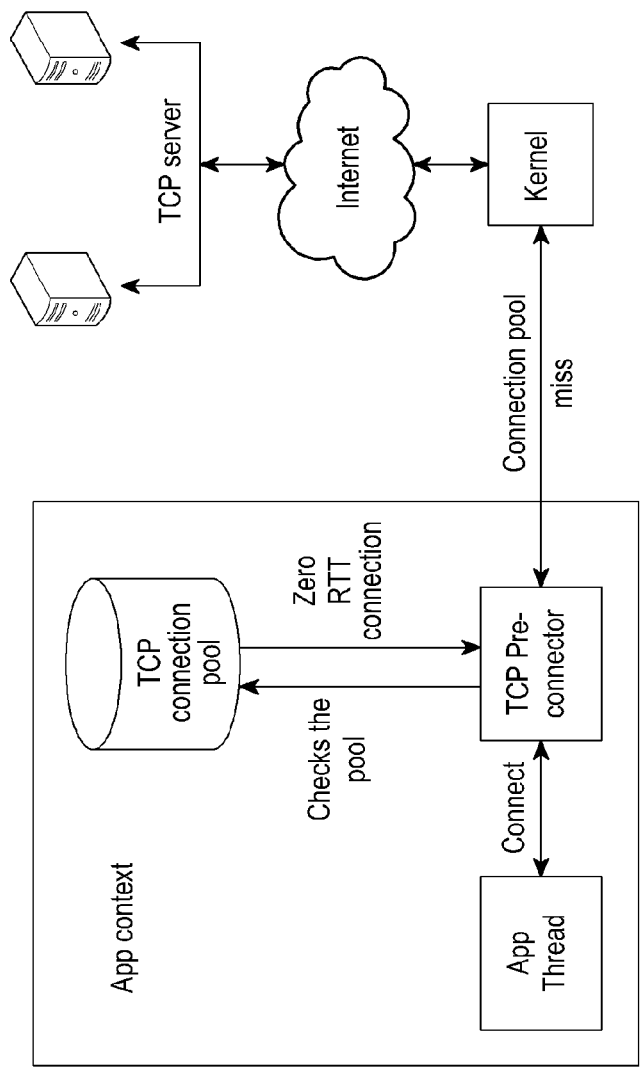
[Fig. 13c]
TCP Connection Pool format
| Sockfd | IP Address | Port |
|---|---|---|
| 100 | 157.197.82.24 | 443 |
| 101 | 157.197.82.24 | 443 |
| 104 | 52.69.189.25 | 80 |
| 145 | 163.53.78.51 | 80 |

[Fig. 13d]
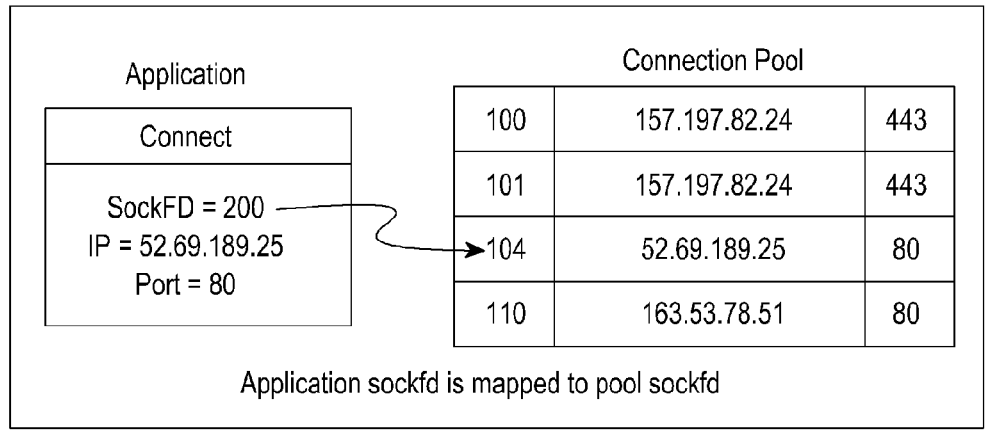
[Fig. 14a]
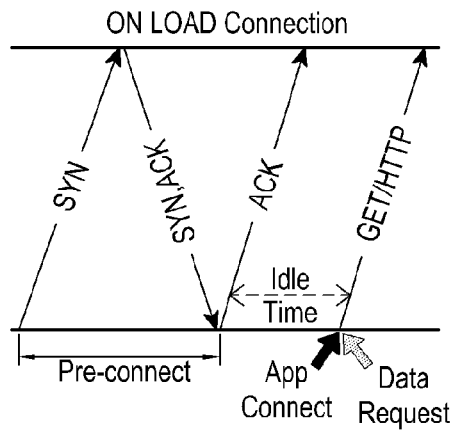
[Fig. 14b]
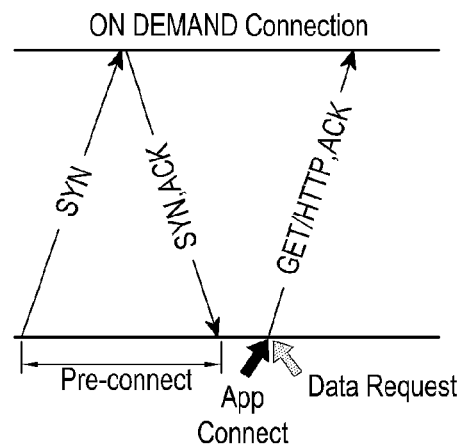

[Fig. 15]
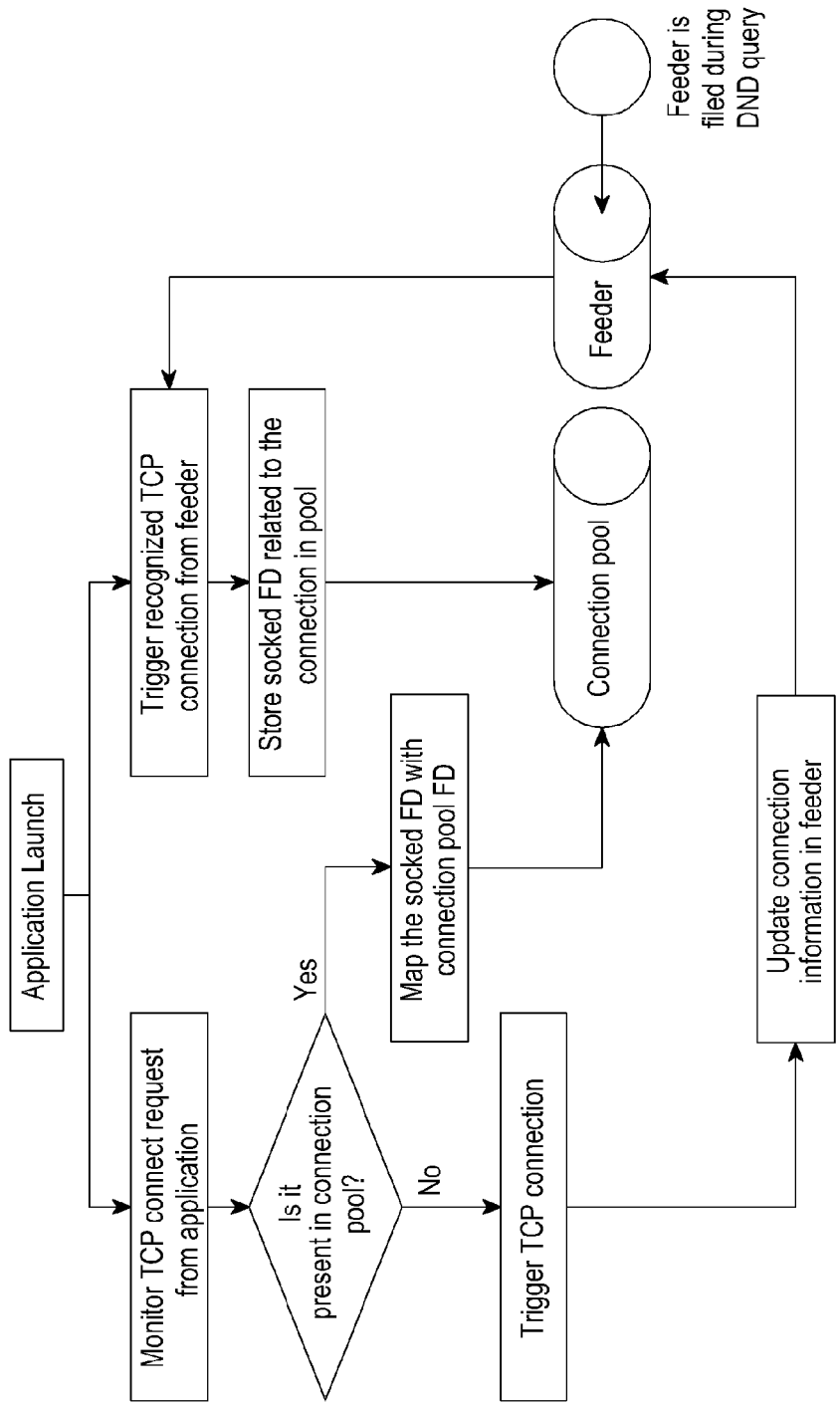

[Fig. 16a]
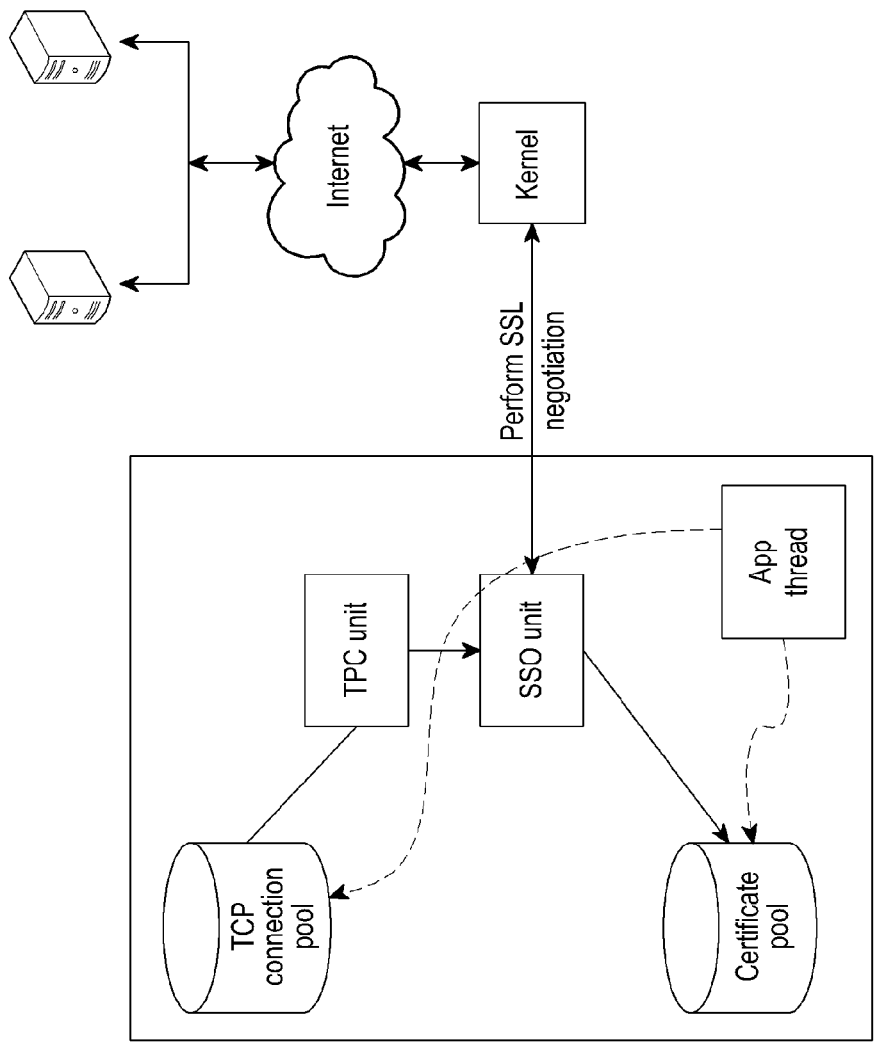
[Fig. 16b]
| Certificate | IP address | Port No. |
| --- | --- | --- |
| #1 | 157.197.82.24 | 443 |
| #2 | 157.197.82.24 | 443 |
| #3 | 52.69.189.25 | 80 |
| #4 | 163.53.78.51 | 80 |

[Fig. 16c]
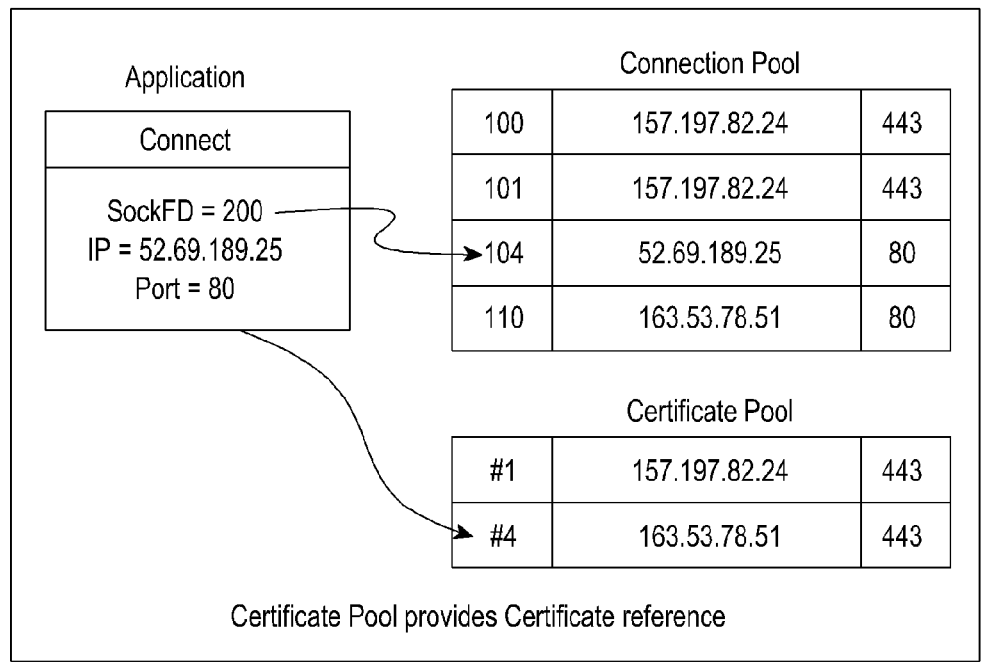
[Fig. 17a]
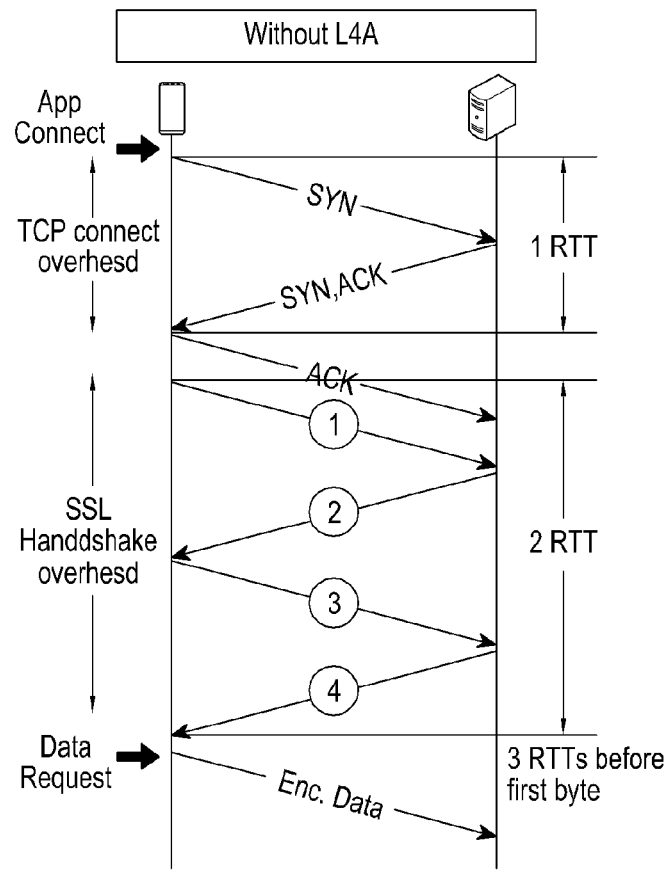

[Fig. 17b]
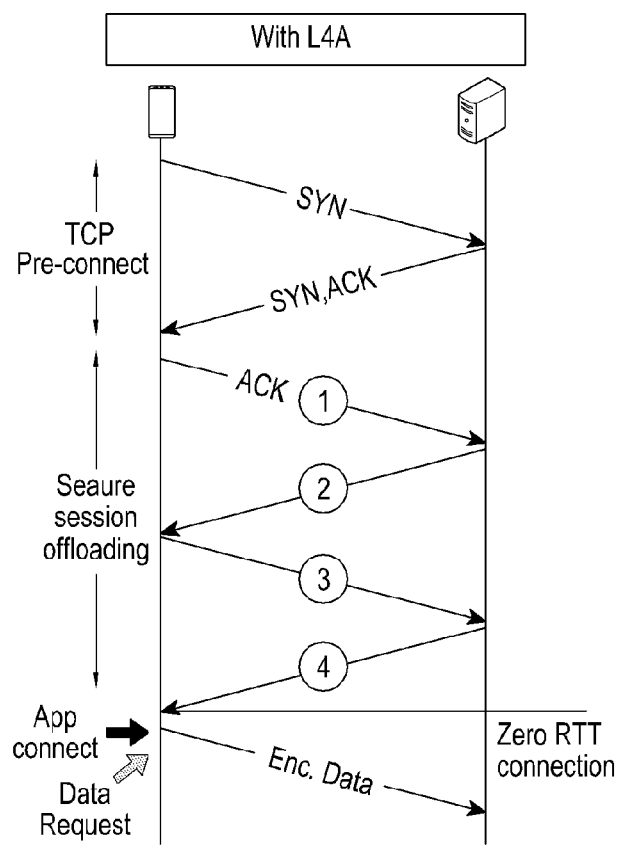

[Fig. 18]
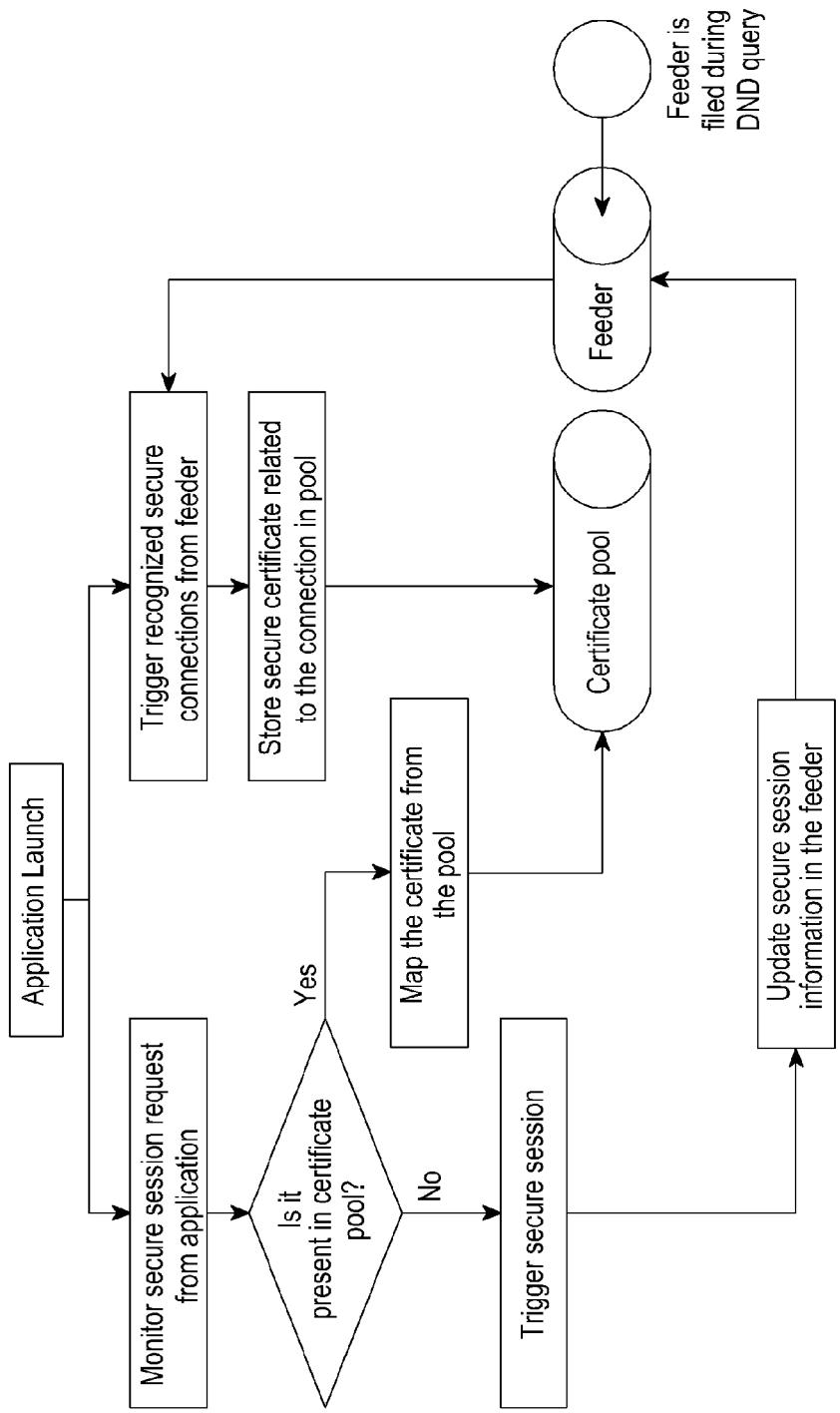

[Fig. 19a]
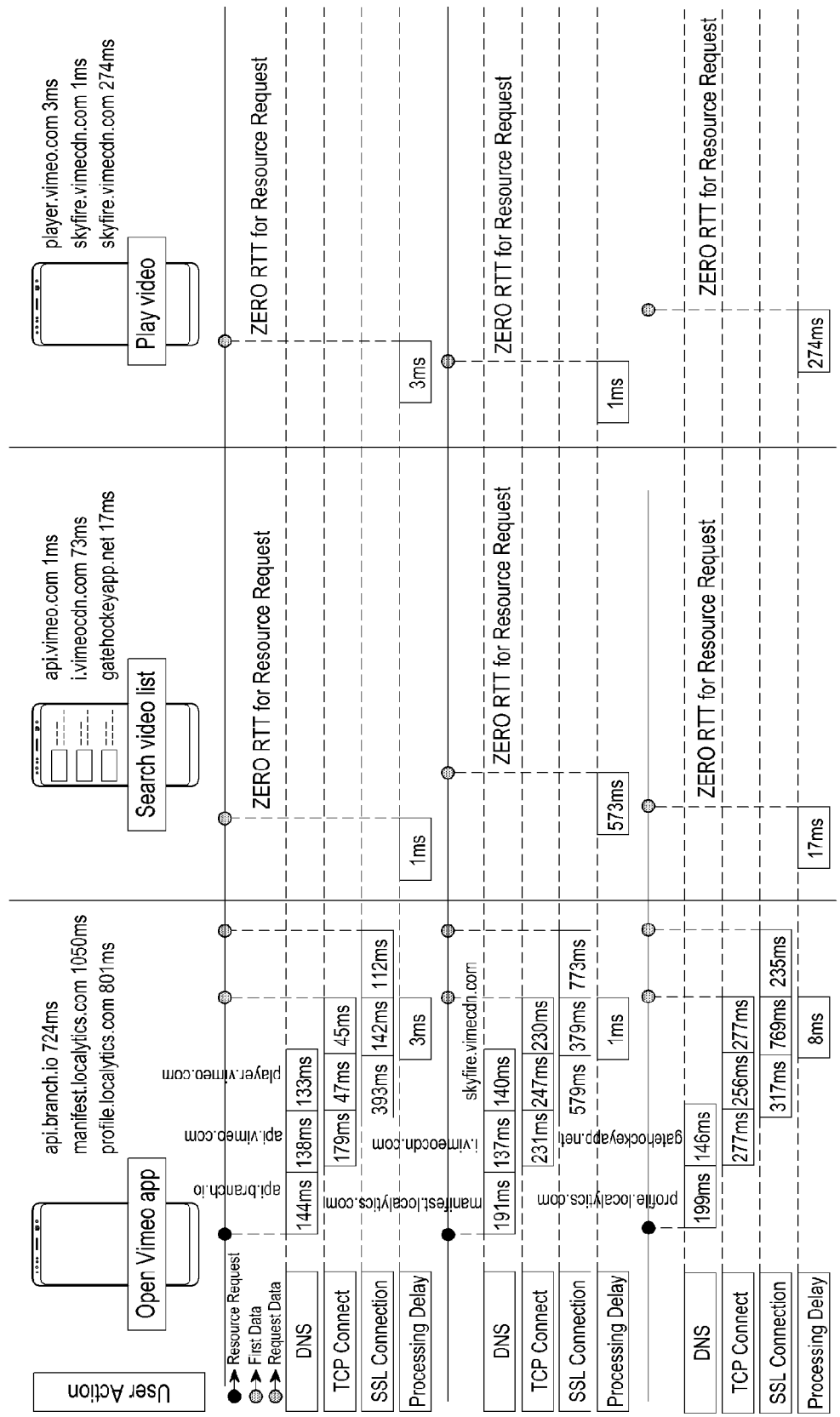

[Fig. 19b]
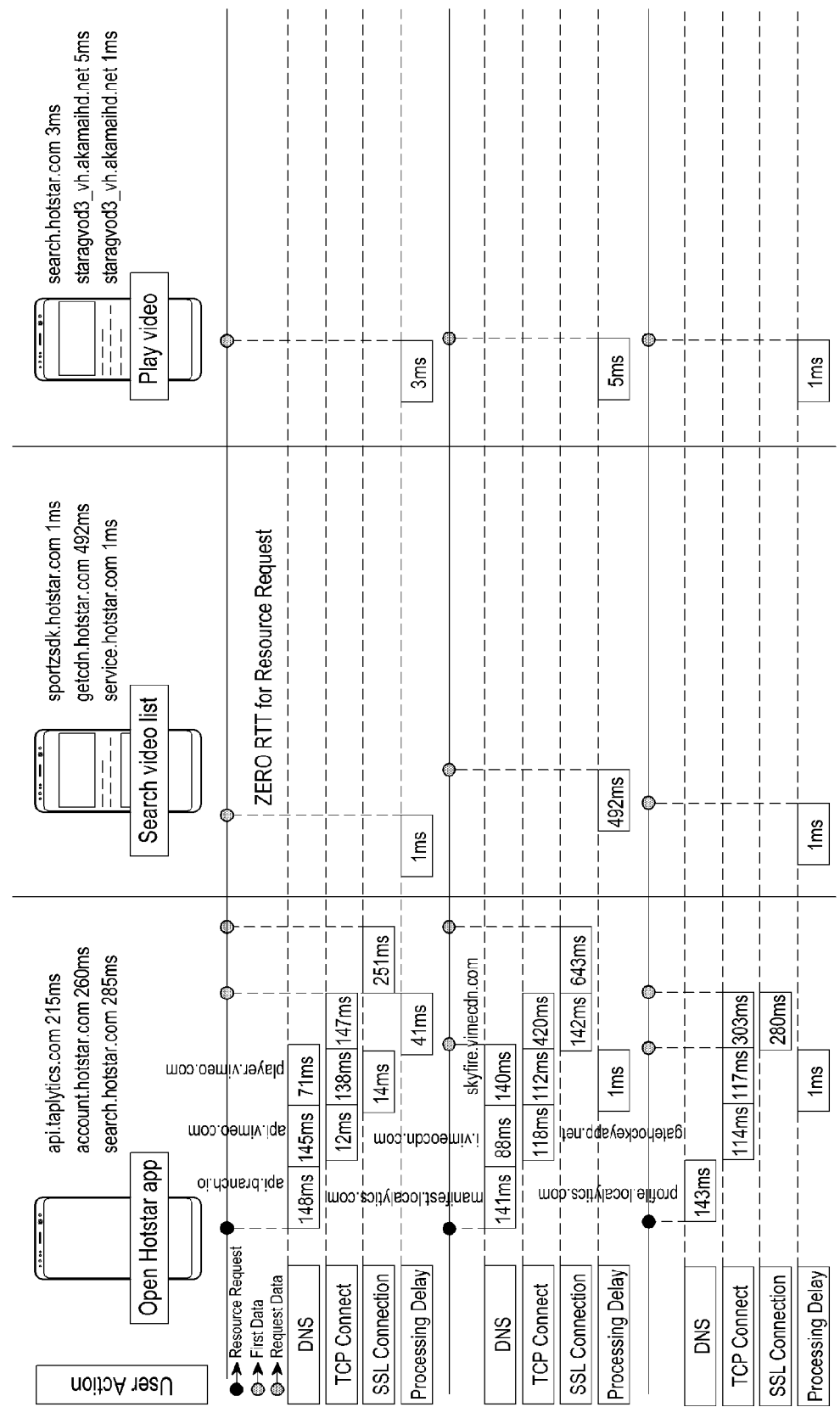

METHOD AND APPARATUS FOR REDUCING LATENCY OF NETWORK PROTOCOLS

CROSS-REFERENCE TO RELATED APPLICATIONS

This application is a 371 of International Application No. PCT/KR2018/004106 filed on Apr. 6, 2018, which claims priority to India Patent Application No. 201741012683 filed on Apr. 7, 2017 and India Patent Application No. 201741012683 filed on Apr. 4, 2018, the disclosures of which are herein incorporated by reference in their entirety.

BACKGROUND

1. Field

The present disclosure relates to communication networks and more particularly to reducing latency caused by network protocols in communication networks.

2. Description of Related Art

Generally, in a communication network, certain initialization steps needs to be performed using protocol stack of an Internet suite before a client application sends a first byte to a server. The initialization steps can be performed for socket setup that includes Domain Name System (DNS) lookup, Transmission Control Protocol (TCP) 3-way handshake and Secure Socket Layer (SSL)/Transport Layer Security (TLS) certificate exchange. After performing the initialization steps, the client application can fetch responses from the server. Thus, time required for completion of the socket setup creates connectivity overhead to the client application and affects user experience.

In the case of DNS Lookup as depicted in FIG. 1a, the client application performs the DNS lookup for resolving domain name to IP address as web contents hosted across multiple servers are referred with various domain names. The DNS lookup may take at least one Round Trip Time (RTT). Also, slow responsiveness of a DNS server triggers multiple queries in the communication network which cause user perceived delay in the client application.

In the case of TCP connect Time as depicted in FIG. 1b, after resolving the DNS look up, the client application can connect with the server through the TCP 3-way handshake which consumes an additional RTT along with the DNS lookup. The RTT associated with the TCP 3-way handshake depends on factors such as, but not limited to, a type of radio network, congestion in a path, server load, or the like. If the server is busy, the RTT associated with the TCP 3-way handshake increases significantly even in good network conditions.

Once the client application connects with the server, the SSL/TLS certificate may be exchanged with the server. If the connection between the client application and the TCP server is secure, then this operation may be performed by the client application. In case of the secure connection, SSL/TLS certificates may be exchanged between the client application and the server before sending the request to the server as depicted in FIG. 1c. Exchanging the SSL/TLS certificate may add few more RTTs along with the DNS lookup and the TCP 3-way handshake.

Thus, time required for completion of the socket setup involves several RTTs.

Further, the request triggered by the application needs to wait for the completion of the socket setup for obtaining responses from the server which creates connectivity overhead.

Further, the responses fetched by the server can be affected by multiple network factors, such as, but not limited to, a type of radio network, congested path, number of hops, packet loss and recovery, processing of packets at a router, or the like and results in increased network latency as depicted in FIG. 1d and FIG. 1e. Also, the RTT may equal to two times of the network latency. Thus, a cumulative time of the DNS lookup, the TCP 3-way handshake and the SSL/TLS certificate exchange along with the increased network latency affects page loading and content downloading time by impacting the user experience.

FIGS. 2 and 3 depict example scenarios of how the above mentioned connectivity overheads affect application page loading and content downloading time, which impact the user experience and throughput.

For example, two video streaming applications are shown in FIGS. 2 and 3 respectively. Whenever the client opens the video streaming applications, the initialization steps can be performed for the socket setup including the DNS lookup, the TCP 3-way handshake and the SSL/TLS certificate exchange. The initialization steps are performed before the video streaming applications send a first byte to the server. Thus, the socket setup time involves several RTTs which create the connectivity overhead to the client applications as illustrated in FIGS. 2 and 3.

Similarly, whenever the client performs search for video list using the applications as illustrated in FIGS. 2 and 3, the DNS lookup, the TCP 3-way handshake and the SSL/TLS certificate exchange can be performed which involve the several RTTs. Thus, affecting the application page downloading. Similarly, on receiving the request from the client for playing the videos, the DNS lookup, the TCP 3-way handshake and the SSL/TLS certificate exchange can be performed which increase the content downloading time.

A speculative pre-connection approach is applicable only to a browser resident on a user device, and requires changes in the browser, wherein the approach reduces the DNS lookup time of the browser only. This approach also supports only HTTP and HTTPS and requires a user input. This approach does not perform DNS optimization.

An adaptive DNS pre-fetching approach does not support TCP layer protocols. This approach also alters the existing cache and does not perform DNS optimization.

A parallel, side-effect based DNS pre-caching approach is applicable only to a browser resident on a user device, and requires changes in the browser, wherein the approach reduces the DNS lookup time of the browser only and does not perform DNS optimization. This approach does not support TCP layer protocols. This approach also requires user input for DNS lookup.

A DNS resolution of hyperlinked content approach is applicable only to a browser resident on a user device, and requires changes in the browser, wherein the approach reduces the DNS lookup time of the browser only and does not perform DNS optimization. This approach also requires user input for DNS lookup. This approach only supports HTTP, and does not support protocols such as SSL/TLS.

Another approach which predicts user requests to reduce latency is applicable only to a browser resident on a user device, and requires changes in the web client application, wherein the approach reduces the DNS lookup time based on user input and does not perform DNS optimization. This approach only supports HTTP, and does not support protocols such as SSL/TLS. This approach also requires user input for DNS lookup.

SUMMARY

The principal object of the embodiments herein is to provide methods and systems for reducing network protocol latency for application(s) installed on an electronic device.

Another object of the embodiments herein is to disclose a method for pre-resolving Domain Name System (DNS) queries for the application(s) installed on the electronic device to reduce DNS lookup time.

Another object of the embodiments herein is to disclose a method for pre-connecting the application(s) with Transmission Control Protocol (TCP) servers to reduce TCP connect time.

Another object of the embodiments herein is to disclose a method for exchanging secure certificates (secure socket layer (SSL) certificates) with the TCP servers before application request for the secure certificate negotiation.

BRIEF DESCRIPTION OF THE DRAWINGS

The principal object of the embodiments herein is to provide methods and systems for reducing network protocol latency for application(s) installed on an electronic device.

Another object of the embodiments herein is to disclose a method for pre-resolving Domain Name System (DNS) queries for the application(s) installed on the electronic device to reduce DNS lookup time.

Another object of the embodiments herein is to disclose a method for pre-connecting the application(s) with Transmission Control Protocol (TCP) servers to reduce TCP connect time.

Another object of the embodiments herein is to disclose a method for exchanging secure certificates (secure socket layer (SSL) certificates) with the TCP servers before application request for the secure certificate negotiation.

Accordingly the embodiments provide methods and systems for reducing network protocol latency for at least one application on electronic device. A method includes pre-resolving Domain Name System (DNS) queries for an application. The DNS queries are pre-resolved before triggering a DNS resolution query from the application. Further, the method includes pre-connecting TCP connections associated with the application with a Transmission Control Protocol (TCP) server. The TCP connections are pre-connected with the TCP server before receiving a TCP connection request from the application.

Further, the method includes exchanging secure certificates with the TCP server to secure the pre-connected TCP connections. The secure certificates are exchanged before receiving a request from the application for secure certificate negotiation.

A Layer 4 accelerator engine for reducing network protocol latency for at least one application installed on an electronic device. The Layer 4 accelerator includes a DNS yielder unit configured to pre-resolve Domain Name System (DNS) queries for an application. The DNS queries are pre-resolved before triggering a DNS resolution query from the application. Further, the Layer 4 accelerator includes a TCP pre-connecting (TPC) unit configured to pre-connect TCP connections associated with the application with a Transmission Control Protocol (TCP) server. The TCP connections are pre-connected with the TCP server before receiving a TCP connection request from the application.

Further, the Layer 4 accelerator includes a Secure Session Off-loader (SSO) unit configured to secure certificates with the TCP server to secure the pre-connected TCP connections. The secure certificates are exchanged before receiving a request from the application for secure certificate negotiation.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

Embodiments herein are illustrated in the accompanying drawings, throughout which like reference letters indicate corresponding parts in the various figures. The embodiments herein will be better understood from the following description with reference to the drawings, in which:

FIGS. 1a, 1b, 1c, 1d, 1e, 2 and 3 depict example scenarios illustrating connectivity overheads for an application, wherein the connectivity overheads affect application page loading and content downloading time, which impact the user experience and throughput;

FIG. 4 is an example communication network for reducing network protocol latency for an application installed on an electronic device, according to embodiments as disclosed herein;

FIG. 5 is a block diagram illustrating various units of a Layer 4 accelerator engine for reducing socket setup time for an application installed on an electronic device, according to embodiments as disclosed herein;

FIG. 6 is a flow diagram for reducing network protocol latency for an application installed on an electronic device, according to embodiments as disclosed herein;

FIG. 7 depicts overview of Layer 4 accelerator engine operations, according to embodiments as disclosed herein;

FIG. 8 is an example architecture of a Layer 4 accelerator engine, according to embodiments as disclosed herein;

FIG. 9a and FIG. 9b are example schematic diagrams illustrating comparison of Domain Name System (DNS) lookup operations performed according to existing techniques and by a Layer 4 accelerator engine respectively, according to embodiments as disclosed herein;

FIG. 10a is an example diagram illustrating creation of an application specific DNS cache for quick DNS response, according to embodiments as disclosed herein;

FIG. 10b is an example diagram illustrating DNS optimization of shared domain names, according to embodiments as disclosed herein;

FIGS. 11a and 11b are example diagrams illustrating comparison of DNS lookup performed according to existing techniques and by a Layer 4 accelerator engine respectively in a single stack device respectively, according to embodiments as disclosed herein;

FIG. 11c and FIG. 11d are example diagrams illustrating comparison of DNS lookup performed according to existing techniques and by a Layer 4 accelerator engine respectively in a dual stack device, according to embodiments as disclosed herein;

FIG. 11e and FIG. 11f are example diagrams illustrating comparison of dual stack optimization performed according to existing techniques and a Layer 4 accelerator engine respectively, according to embodiments as disclosed herein;

FIG. 12 is an example flow diagram illustrating a method for pre-resolving DNS queries for an application ahead of application request time, according to embodiments as disclosed herein;

FIGS. 13a, 13b, 13c and 13d depict operations of a TCP pre-connecting (TPC) unit, according to embodiment as disclosed herein;

FIG. 14a and FIG. 14b are example sequences illustrating handling of TCP connections for reducing TCP connect time, according to embodiments disclosed herein;

FIG. 15 is an example flow diagram illustrating a method for pre-connecting an application with TCP server(s) 404, according to embodiments as disclosed herein;

FIGS. 16a, 16b and 16c depict operations of a Secure Session Off-loader (SSO) unit, according to embodiments as disclosed herein;

FIG. 17a and FIG. 17b are example sequence diagrams illustrating Secure Socket Layer (SSL)/Transport Layer Security (TLS) certificates negotiations performed according to existing techniques and by a Layer 4 accelerator engine, according to embodiments as disclosed herein;

FIG. 18 is an example flow diagram illustrating a method for reducing secure certificate exchange time, according to embodiments as disclosed herein; and FIGS. 19a and 19b depict example scenarios, wherein the latency caused by the network protocols can be reduced to provide zero connectivity overhead for the applications, according to embodiments as disclosed herein.

DETAILED DESCRIPTION

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein disclose methods and systems for reducing network protocol latency for applications installed on an electronic device.

A method disclosed herein pre-resolves Domain Name System (DNS) queries triggered by the applications. The DNS queries are pre-resolved before receiving at least one query from the applications for DNS resolution. Pre-resolving the DNS queries includes identifying frequently triggered queries from the plurality of DNS queries, caching the frequently triggered queries and corresponding DNS responses and performing DNS optimization by reducing DNS queries with same alias (CNAME). Thus, pre-resolving the DNS queries ahead of application request time reduces DNS lookup time, wherein the identifying frequently triggered queries comprise identifying DNS queries triggered a number of times which is equal to or greater than a threshold during a predetermined period.

Further, the method includes pre-connecting TCP connections associated with the applications with Transmission Control Protocol (TCP) servers. The TCP connections can be pre-connected with the TCP servers before receiving at least one TCP connection request from the applications. Thus, reducing TCP handshake Round Trip Time (RTT) by reducing Three-way Handshake (3WHS) time by connecting in advance.

Further, the method includes exchanging secure certificates (Secure Socket Layer (SSL)/Transport Layer Security (TLS) certificates) with the TCP servers. The secure certificates can be exchanged before receiving at least one request for secure certificate exchange. Further, exchanging the secure certificates ahead of application request time reduces secure certificate exchange time. Thus, reducing the DNS lookup time, the TCP connect time and the secure certificate exchange time reduces socket setup time and provides zero connectivity overhead for the applications installed on the electronic device.

Referring now to the drawings, and more particularly to FIGS. 4 through 18, where similar reference characters denote corresponding features consistently throughout the figures, there are shown example embodiments.

FIG. 4 is an example communication network for reducing network protocol latency for an application installed on an electronic device, according to embodiments as disclosed herein. The example communication network 400 includes the electronic device 402, a Transmission Control Protocol (TCP) server(s) 404, a Domain Name System (DNS) server 406 and a network 108.

The electronic device 402 communicates with the TCP server(s) 404 and the DNS server 406 through the network 108 for serving application requests. The electronic device 402 can be, but is not limited to, a mobile phone, a smartphone, tablet, a phablet, a personal digital assistant (PDA), a laptop, a computer, a wearable computing device, a vehicle infotainment device, an Internet of Things (IoT) device, a navigation device, or any other device which comprises at least one application that can use a network for communication. The TCP server(s) 404 can be content server(s) that serves content requested by the application installed on the electronic device 402. The TCP server(s) 404 serves the content according to self-clock, flow control and congestive control algorithms of a TCP protocol. The DNS server 406 can be configured to operate as part of a DNS to provide IP addresses of webpages and resources to the application installed on the electronic device 402. The network 108 can be, but is not limited to, an internet, a local area network (LAN), a virtual private network (VPN), a wireless area network, Worldwide Interoperability for Microwave Access (WiMAX/IEEE 802.16), Wi-Fi (IEEE 802.11), a cellular network (a Code Division Multiple Access (CDMA) network, a General packet radio service (GPRS) network, a Universal Mobile Telecommunications System (UMTS), a Long Term Evolution (LTE/4G), a 5G based communication network and so on), a wired network (a fiber network, a cable network and so on), or the like.

Further, the electronic device 402 includes a Layer 4 accelerator engine 410 to reduce network protocol latency for an application(s) installed on the electronic device 402. Examples of the application can be, but is not limited to, a web browser, a navigation application, a weather application, a video streaming application, a payment application, a gaming application, a financial application, an education application, a news application, a utility application, a health application or any application that access content from the content server(s) 404.

The Layer 4 accelerator engine 410 can be configured to reduce socket setup time by pre-resolving DNS queries, pre-connecting the application with the TCP server(s) 404 and exchanging secure certificates with the TCP server(s) 404. Further, Thus, reducing the network protocol latency and provides zero connectivity overhead to the application installed on the electronic device 402.

FIG. 5 is a block diagram illustrating various units of the Layer 4 accelerator engine 410 for reducing socket setup time for the application installed on the electronic device 402, according to embodiments as disclosed herein. The Layer 4 accelerator engine 410 can be configured to learn behavior patterns of the application once the application is launched. Based on the behavior patterns of the application, the Layer 4 accelerator engine 410 reduces socket setup time to provide the zero connectivity overhead connectivity to the application. Further, the Layer 4 accelerator engine 410 supports protocols such as, but not limited to, a Hypertext Transfer Protocol (HTTP), a Hyper Text Transfer Protocol Secure (HTTPs) protocol, an application layer protocol, a TCP protocol, a secure socket layer (SSL) protocol or the like. The Layer 4 accelerator engine 410 includes a DNS yielder unit 502, a TCP pre-connecting (TPC) unit 504, a Secure Session Off-loader (SSO) unit 506, a communication interface unit 508 and a memory 510. The Layer 4 accelerator engine 410 may be made up of at least one software module, at least one hardware module or combination thereof, and the Layer 4 accelerator engine 410 may include a memory 510, at least one processor and a communication unit. The communication unit may include the communication interface unit 508 and be configured to perform communication functions of at least part of the DNS yielder unit 502, the TCP pre-connecting (TPC) unit 504 or the Secure Session Off-loader (SSO) unit 506. The at least one processor may be made up of an application processor, a communication processor or combination thereof, and be configured to perform processing functions of at least part of the a DNS yielder unit 502, a TCP pre-connecting (TPC) unit 504, a Secure Session Off-loader (SSO) unit 506, and to control the communication unit and the memory 510. The memory 510 may store instructions to be executed by the at least one processor.

The DNS yielder unit 502 can be configured to pre-resolve the DNS queries triggered from the application. The DNS queries can be triggered for obtaining IP addresses for domain names associated with the application. Pre-resolving the DNS queries reduces the DNS lookup time. For pre-resolving the DNS queries, the DNS yielder unit 502 may use a DNS pre-resolving technique, a DNS caching technique and a DNS optimization technique.

According to the DNS pre-resolving technique, the DNS yielder unit 502 may continuously monitor outgoing DNS queries for the DNS server 406 to resolve the domain names. The DNS yielder unit 502 recognizes frequently triggered DNS queries from the outgoing DNS queries. wherein the frequently triggered DNS queries are recognized by identifying DNS queries from the outgoing DNS queries triggered a number of times which is equal to or greater than a threshold during a predetermined period. Further, the DNS yielder unit 502 receives DNS responses for the frequently triggered DNS queries from the DNS server 406. The frequently triggered DNS queries may be used at the time of launching the application or the time in which the application comes out from background to foreground on the electronic device 402. Further, the DNS yielder unit 502 resolves the frequently triggered DNS queries before receiving a request from the application for DNS resolution.

According to the DNS caching technique, the DNS yielder unit 502 may create a system DNS cache to store the frequently triggered DNS queries and the DNS responses for the frequently triggered DNS queries. The DNS responses can provide the IP addresses for the domain names. In an embodiment, the DNS yielder unit 502 may create an application specific DNS cache for each application for storing the DNS responses and the frequently triggered DNS queries related to each application separately. Thus, creating the application specific DNS cache for each application increases granularity of cache performance and reduces the cost of inter process communication between the application and the system DNS cache.

Further, whenever the application triggers DNS queries, the DNS yielder unit 502 compares the triggered DNS queries with the frequently triggered DNS queries stored in the application specific DNS cache. If the triggered DNS queries match with the frequently triggered DNS queries, the DNS yielder unit 502 provides the DNS responses stored in the application specific DNS cache to the triggered DNS queries. Thus, providing speedy DNS responses to the application.

In an embodiment, the DNS yielder unit 502 may identify a change in the domain names by monitoring hit count of the application specific DNS cache. The change in the domain names can be monitored to remove unused domain names created in a list of domain names that need to be pre-resolved. Further, the DNS yielder may receive shorter Time to Live (TTL) valued DNS responses which triggers unnecessary DNS queries. The DNS yielder unit 502 analyzes the shorter TTL valued DNS responses and provides cached DNS responses to the application.

According to the DNS optimization technique, the DNS yielder unit 502 may identify shared hosting servers and optimizes the DNS queries triggered by the application. If multiple domain names are associated with the shared hosting servers, then the DNS yielder unit 502 groups the multiple domain names as one group to reduce a number of outgoing DNS queries for the shared hosting servers. The multiple domain names can be grouped by using a DNS alias name and a set of IP addresses. In an embodiment herein, the DNS alias name can be a common name (CNAME).

The TPC unit 504 can be configured to connect the application with the TCP server(s) 404 before receiving a TCP connection request from the application. Pre-connecting the application with the TCP server(s) 404 reduces the TCP connect time for the application. For pre-connecting the application with the TCP server(s) 404, the TPC unit 504 monitors the IP addresses obtained by the DNS yielder unit 502 and identifies TCP connections associated with the application per domain name. After identifying the TCP connections per domain name, the TPC unit 504 pre-connects the identified TCP connections with the TCP server(s) 404 ahead of the application request time. Further, the TPC unit 504 creates a connection pool to store information about the pre-connected TCP connections with the TCP server(s) 404. The connection pool includes a socket descriptor, an IP address and a port number for each pre-connected TCP connection with the TCP server(s) 404.

Further, on receiving a request from the application for the TCP connection, the TPC unit 504 intercepts the request and checks for an existence of the requested TCP connection in the connection pool. By determining that the requested TCP connection exists in the connection pool, the TPC unit 504 acquires a pre-connected TCP connection from the connection pool. Further, the TPC unit 504 maps the acquired TCP connection with the received request for providing zero Round Trip Time (RTT) TCP connection to the application.

In an embodiment, on receiving a request from the application for parallel TCP connections, the TPC unit 504 may utilize the IP addresses obtained by the DNS yielder unit 502 to distribute load among the TCP server(s) 404 and minimizes TCP backlog queuing delay for establishment of the TCP connections.

In addition, a number of TCP connections that an application demands can vary. The demand can be for more or less TCP connections as compared to the TCP connections available in the connection pool. The TPC unit 504 can be configured to handle such varying demands created by the application. For example, if the application requests a lesser number of TCP connections, the TCP server 404 may close unused TCP connections in the connection pool after a time-out period. If the application requests more number of TCP connections, the connection pool cannot serve the requested number of TCP connections. On receiving either the lesser number of TCP requests or the more number of TCP requests, the TPC unit 504 may adjust a TCP connection count for further pre-connecting the TCP connections with the TCP server(s) 404.

The SSO unit 506 can be configured to secure the TCP connections established between the application and the TCP server(s) 404. The TCP connections can be secured by exchanging the secure certificates with the TCP server(s) 404 before receiving a secure certificate exchange request from the application. The secure certificates can be a secure socket layer (SSL) certificate/transport layer security (TLS) certificate. Exchanging the secure certificates with the TCP server(s) 404 ahead of the application request time reduces the secure certificate exchange time.

The SSO unit 506 may receive a signal from the TPC unit 504 for exchanging the secure certificates with the TCP server(s) 404 ahead of the application request for secure certificate negotiation. After receiving the signal from the TPC unit 504, the SSO unit 506 may access the connection pool to obtain the socket descriptors of the pre-connected TCP connections. Based on the obtained socket descriptors, the SSO unit 506 exchanges the secure certificates with the TCP server(s) 404 over sockets on behalf of the application. Also, the SSO unit 506 may create a certificate pool to store the exchanged secure certificates with the obtained socket descriptors from the connection pool as references. The certificate pool includes information about a secure certificate, an IP address and a port number for each pre-connected TCP connection.

Further, on receiving a request from the application for exchanging the secure certificates, the SSO unit 506 intercepts the request and checks for an existence of a socket descriptor reference associated with the request in the certificate pool. If the socket descriptor reference matches with any one of the socket descriptor references, the SSO unit 506 then acquires the secure certificate related to the matched socket descriptor reference from the certificate pool. Further, the SSO unit 506 maps the acquired secure certificate with the request received from the application by reducing the secure certificate exchange time. Thus, reducing the DNS lookup time, the TCP connect time and the secure certificate exchange time reduces the socket setup time and provides the zero connectivity overhead to the application.

The communication interface unit 508 can be configured to communicate with the external entities such as the TCP server(s) 404, the DNS server 406, or the like.

The memory 510 can be configured to store DNS patterns (DNS queries), secure certificate patterns and TCP patterns (TCP connections) for each application. The memory 510 may include one or more computer-readable storage media. The memory 510 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 510 may, in some examples, be considered a non-transitory storage medium. The term "non-transitory" may indicate that the storage medium is not embodied in a carrier wave or a propagated signal. However, the term "non-transitory" should not be interpreted to mean that the memory 510 is non-movable. In some examples, the memory 510 can be configured to store larger amounts of information than the memory. In certain examples, a non-transitory storage medium may store data that can, over time, change (e.g., in Random Access Memory (RAM) or cache).

FIG. 5 shows exemplary units of the Layer 4 accelerator engine 410, but it is to be understood that other embodiments are not limited thereon. In other embodiments, the Layer 4 accelerator engine 410 may include less or more number of units. Further, the labels or names of the units are used only for illustrative purpose and does not limit the scope of the embodiments herein. One or more units can be combined together to perform same or substantially similar function in the Layer 4 accelerator engine 410.

FIG. 6 is a flow diagram for reducing network protocol latency for the application installed on the electronic device 402, according to embodiments as disclosed herein.

At step 602, the method includes pre-resolving the DNS queries for the application. The method allows the DNS yielder unit 502 to pre-resolve the DNS queries for the application. The DNS queries can be resolved ahead of the application request time. For pre-resolving the DNS queries, the DNS yielder unit 502 monitors the outgoing DNS queries for the DNS server 406 and identifies the frequently triggered DNS queries. The DNS yielder unit 502 stores the frequently triggered DNS queries and the DNS responses for the frequently triggered DNS queries in the system DNS cache. Further, the DNS yielder unit 502 creates the application specific DNS cache to store the frequently triggered DNS queries and the DNS responses related to each application separately. Thus, the DNS yielder unit 502 can provide faster DNS responses to the DNS queries by checking the application specific DNS cache which reduces the DNS lookup time for the application.

At step 604, the method includes pre-connecting the application with the TCP server(s) 404. The method allows the TPC unit 504 to pre-connect the application with the TCP server(s) 404. For pre-connecting the application with the TCP server(s) 404, the TPC unit 504 monitors the IP addresses obtained from the DNS yielder unit 502 and identifies the TCP connections associated with the application. The TPC unit 504 pre-connects the identified TCP connections with the TCP server(s) 404. Further, the TPC unit 504 creates the connection pool to store the information about the pre-connected TCP connections. The connection pool includes the socket descriptor, the IP addresses and port information of the pre-connected TCP connections with the TCP server(s) 404. Thus, the TPC unit 504 can use the connection pool to provide the zero RTT TCP connection to the application in response to receiving the TCP connection request from the application.

At step 606, the method includes exchanging the secure certificates with the TCP server(s) 404 to establish a secure session between the application and the TCP server(s) 404. The method includes allowing the SSO unit 506 to exchange the secure certificates with the TCP server(s) 404 to establish a secure session between the application and the TCP server(s) 404. The SSO unit 506 exchanges the secure certificates with the TCP server(s) 404 to secure the pre-connected TCP connections ahead of the application request for secure certificate negotiation. The SSO unit 506 creates the certificate pool to store the information about the exchanged secure certificates along with the socket descriptors of the pre-connected TCP connections as references. Further, the SSO unit 506 checks the certificate pool to provide the secure certificate to the application in response to receiving the secure certificate exchange request. Thus, reducing the secure certificate exchange time for the application.

The various actions, acts, blocks, steps, or the like in the method and the flow diagram 600 may be performed in the order presented, in a different order or simultaneously. Further, in some embodiments, some of the actions, acts, blocks, steps, or the like may be omitted, added, modified, skipped, or the like without departing from the scope of the invention.

FIG. 7 depicts overview of Layer 4 accelerator engine operations, according to embodiments as disclosed herein. Embodiments herein enable the Layer 4 accelerator engine 410 performs socket setup ahead of the application request time. Thus, providing the zero connectivity overhead to the application and improves page downloading time without hampering user experience.

As illustrated in FIG. 7, socket setup time includes the DNS lookup time, the TCP connect (TCP 3-way handshake) time and the secure certificate exchange time. The DNS yielder unit 502 can reduce the DNS lookup time by pre-resolving the DNS queries for the application.

The DNS yielder unit 502 pre-resolves the DNS queries by identifying and caching the frequently triggered DNS queries and the corresponding DNS responses. Consider the frequently triggered DNS queries may be '$n_f$' and total number of DNS queries triggered by the application may be '$n_d$'. Then, the probability '$P_d$' of a DNS query existing in the application specific DNS cache may be given by:

$$P_d = \frac{n_f}{n_d} \qquad \text{[Math. 1]}$$

As the DNS yielder ensures zero DNS lookup overhead and conditional cache hit, a performance gain of the DNS yielder unit 502 can be given by:

$$T_{dy} = P_d * R_d \qquad \text{[Math. 2]}$$

wherein, '$R_d$' may be RTT of the DNS query.

Further, the TPC unit 504 reduces the TCP connect time by providing the requested TCP connections to the application using the connection pool. Consider '$N_t$' may be a number of TCP connections requested by the application. '$N_t$' may be approximated as Poisson random variable with a mean '$\lambda_t$'. Further, a number of TCP connections stored in the connection pool may be '$\mu_t$', Then the probability '$P_t$' of the application requesting more number of TCP connections than in the connection pool can be given by:

$$P_t = 1 - Q(\mu_t + 1, \lambda_t) \qquad \text{[Math. 3]}$$

wherein, 'Q' may be a regularized gamma function.

A performance gain '$T_{tpc}$' of the TPC unit 504 can be given by:

$$T_{tpc} = P_d * (1 - P_t) * R_t \qquad \text{[Math. 4]}$$

wherein, '$R_t$' can be maximum RTT of the TCP connections requested by the application.

Further, the SSO unit 506 reduces the secure certificate exchange time by securely exchanging the secure certificates with the TCP server(s) 404 ahead of the application request time. A performance gain of the SSO unit 506 can be:

$$T_{sso} = P_d * (1 - P_t) * P_s * T_s \qquad \text{[Math. 5]}$$

wherein, '$P_s$' may be the probability of a connection established using the secure certificate (the SSL certificate) and '$T_s$' may be time taken for exchanging the SSL certificate with the TCP server(s) 404.

Further, total performance gain of the Layer 4 accelerator engine 410 can be given by sum of the performance gain of the DNS yielder unit 502, the TPC unit 504 and the SSO unit 506. The total performance gain of the Layer 4 accelerator engine 410 can be represented as:

$$T = T_{dy} + T_{tpc} + T_{sso} \qquad \text{[Math. 6]}$$

Further, using equations 2, 4 and 5, equation 6 can be represented as:

$$T = (P_d * R_d) + (P_d * (1 - P_t) * R_t) + (P_d * (1 - P_t) * P_s * T_s) \qquad \text{[Math. 7]}$$

Equation 7 can be further simplified and the simplified equation for the total performance gain of the Layer 4 accelerator engine 410 can be given by:

$$T = P_d * [R_d + ((1 - P_t) * R_t) + ((1 - P_t) * P_s * T_s)] \qquad \text{[Math. 8]}$$

FIG. 8 is an example architecture of the Layer 4 accelerator engine 410, according to embodiments as disclosed herein. Embodiments herein can deploy the Layer 4 accelerator engine 410 between applications and a C library (libc) interface. The C library interface and a kernel may provide services required for the application by connecting to required servers (the TCP server(s) 404 and the DNS server 406) using modem, Wi-Fi connection and so on.

The Layer 4 accelerator engine 410 can be configured to reduce latency caused by the network protocols in the electronic device 402 by moving the socket setup time ahead of the application request time. Further, embodiments herein enable the Layer 4 accelerator engine 410 to reduce the latency caused by the network protocols without performing any changes in the applications, the kernel, or the like. In addition, the Layer 4 accelerator engine 410 may not require user inputs. In addition, the Layer 4 accelerator engine 410 does not change an existing system cache.

For reducing the network protocol latency, the DNS yielder unit 502 reduces the DNS lookup overhead by pre-resolving the domain names and caching the DNS responses for the frequently triggered DNS queries. Also, the DNS yielder unit 502 may perform the DNS query optimization by analyzing the DNS patterns of the application. Further, the TPC unit 504 avoids TCP 3-way handshake latency by connecting the application to the TCP server ahead of the application request time. Similarly, the SSO unit 506 offloads secure certificate exchange on behalf of the application and avoids the delay caused during exchange of the secure certificates with the TCP server(s) 404.

FIG. 9a and FIG. 9b are example schematic diagrams illustrating comparison of Domain Name System (DNS) lookup operations performed according to existing techniques and by the Layer 4 accelerator engine 410 respectively, according to embodiments as disclosed herein. As illustrated in FIG. 9a, according to the existing techniques, the DNS lookup for resolving domain names domain1-domain4 can be only performed whenever the application sends a first byte to the server. Thus, the DNS lookup time can be increased and creates connectivity overhead for the application by impacting the user experience. As illustrated in FIG. 9b, embodiments herein enable the DNS yielder 502 to monitor DNS queries associated with the application to resolve multiple domain names domain1-domain4. Further, the DNS yielder unit 502 fetches the IP addresses from the DNS server 406 for the multiple domain names ahead of the application request time. Thus, the DNS yielder unit 502 can provide the zero RTT DNS lookup for the application.

FIG. 10*a* is an example diagram illustrating creation of an application specific DNS cache for quick DNS response, according to embodiments as disclosed herein. As illustrated in FIG. 10*a*, the DNS yielder unit 502 may learn the DNS patterns of the application and identifies the frequently triggered DNS queries to resolve the domain names. The DNS yielder unit 502 may fetch the DNS responses (IP addresses) for the frequently triggered DNS queries from the DNS server 406 through the network 108 (the Internet). Further, the DNS yielder unit 502 creates the system DNS cache to store the frequently triggered DNS queries and the DNS responses for the frequently triggered DNS queries. Further, the DNS yielder unit 502 may create the application specific DNS cache for each application to store the frequently triggered DNS queries and the DNS responses for the frequently triggered DNS queries related to each application. Thus, the inter communication between the applications and the system DNS cache can be reduced.

For example, an application 1 and an application 2 may be launched on the electronic device 402. During launching of the application 1 and the application 2, the DNS yielder unit 502 may create an application 1 specific DNS cache for the application 1 and an application 2 specific DNS cache for the application 2. The DNS yielder unit 502 may store the DNS responses and the frequently triggered DNS queries associated with the application 1 in the application 1 specific DNS cache. Similarly, the DNS yielder unit 502 may store the DNS responses and the frequently triggered DNS queries associated with the application 2 in the application 2 specific DNS cache.

Further, when the DNS yielder unit 502 receives the request for DNS resolution from the application 1, the DNS yielder unit 502 checks the application 1 specific DNS cache instead of the system DNS cache to provide the DNS responses for the received request. Similarly, when the DNS yielder unit 502 receives the request for DNS resolution from the application 2, the DNS yielder unit 502 checks the application 2 specific DNS cache to provide the DNS responses for the received request. Thus, reducing the DNS lookup time.

FIG. 10*b* is an example diagram illustrating DNS optimization of shared domain names, according to embodiments as disclosed herein. Embodiments herein enable the DNS yielder unit 502 to group multiple domain names having same IP addresses and the DNS alias name (CNAME). For example, a first domain name may be service.abc.com and a second domain name may be account-.abc.com. Further, the first domain name and the second domain name may have the same IP address and the CNAME. In response to determining that the first domain name and the second domain name are associated with the same IP address and the CNAME, the DNS yielder unit 502 may group the first domain name and the second domain name as a single domain. Thus, reducing a number of outgoing DNS queries with the same IP address and the CNAME for the shared hosting servers.

FIGS. 11*a* and 11*b* are example diagrams illustrating comparison of DNS lookup performed according to existing techniques and by the Layer 4 accelerator engine 410 respectively in a single stack device respectively, according to embodiments as disclosed herein. For example, the application may be installed on the single stack device. The single stack device can be an electronic device that supports an IPv4 protocol. In the existing techniques as illustrated in FIG. 11*a*, when the application requests the DNS server for resolving the domain names, the DNS lookup can be performed. Further, the RTT may be increased and creates the connectivity overhead for the application. Embodiments herein enable the DNS yielder unit 502 to provide cached DNS response to the application by receiving the request for DNS resolution as illustrated in FIG. 11*b*. Thus, the speedy DNS responses can be provided to the application.

FIG. 11*c* and FIG. 11*d* are example diagrams illustrating comparison of DNS lookup performed according to existing techniques and by the Layer 4 accelerator engine 410 respectively in a dual stack device, according to embodiments as disclosed herein. Two types of DNS queries can be triggered by the application when the application is installed on the dual stack device. The dual stack device can be an electronic device that supports the IPv4 protocol and the IPv6 protocol. For example, the two types of DNS queries can be a type A query and a type AAAA query. In the existing techniques as illustrated in FIG. 11*c*, the DNS lookup takes relatively longer time as compared to IPv4 only capable device, because the dual stack device resolves both Type A (IPv4) and Type AAAA (IPv6) DNS queries in sequence. Thus, causing at least two RTT delay in the dual stack device.

As illustrated in FIG. 11*d*, on receiving the DNS queries from the application, the DNS yielder unit 502 may determine the type of query and provides the cached DNS response to the query according to the determined type. Thus, the DNS yielder unit 502 can provide the speedy cached DNS response to both the type A query and the type AAAA query.

FIG. 11*e* and FIG. 11*f* are example diagrams illustrating comparison of dual stack optimization performed according to existing techniques and the Layer 4 accelerator engine 410 respectively, according to embodiments as disclosed herein. The application installed on the dual stack device may use the DNS responses provided for at least one of the type A query or the type AAAA query. However, the existing techniques may not be able to recognize the DNS responses used by the application and increases the DNS lookup time as illustrated in FIG. 11*e*.

As illustrated in FIG. 11*f*, if the application uses only the DNS responses provided for the type AAAA query, the DNS yielder unit 502 blocks the unnecessary type A query and renews only the type AAAA query. Thus, the DNS yielder unit 502 can perform dual stack query optimization.

FIG. 12 is an example flow diagram illustrating a method for pre-resolving DNS queries for an application ahead of application request time, according to embodiments as disclosed herein. As illustrated in FIG. 12, once the application is launched, the DNS yielder unit 502 triggers the DNS queries recognized from a feeder for resolving the domain names. The feeder stores the DNS patterns or the domain names associated with the previously triggered DNS queries. After triggering the DNS queries recognized from the feeder, the DNS yielder unit 502 may fetch the DNS responses from the DNS server 406 and store the DNS responses for the DNS queries recognized from the feeder in the application specific DNS cache.

In an embodiment, the DNS yielder unit 502 monitors the DNS queries triggered by the application during the launch of the application to resolve the domain names and checks whether the DNS queries are present in the application specific DNS cache or not. In response to determining that the DNS queries are present in the application specific DNS cache, the DNS yielder unit 502 may fetch the DNS responses from the application specific DNS cache for the triggered DNS queries.

In response to determining that one of the DNS queries does not exist in the application specific DNS cache, the DNS yielder unit 502 sends a DNS query which does not exist in the application specific DNS cache to the DNS server 406 to obtain a DNS response. After obtaining the DNS response, the DNS yielder unit 502 checks whether the DNS query is a frequently triggered query or not. If the DNS query is a frequently triggered query, the DNS yielder unit 502 stores the DNS response in the application specific DNS cache. Further, the DNS yielder unit 502 stores a domain name related to the DNS query in the feeder.

Further, in response to determining that the DNS query does not exist in the application specific DNS cache, the DNS yielder unit 502 may check whether the IP address obtained for the DNS query matches with any other domain. If any other domain is having the same IP address, then the DNS yielder unit 502 may group the domain names with the same IP address in the feeder. Thus, the DNS yielder unit 502 can pre-resolve, pre-cache and optimize the DNS queries ahead of the application request time.

FIGS. 13*a*, 13*b*, 13*c* and 13*d* depict operations of the TPC unit 504, according to embodiment as disclosed herein.

FIG. 13*a* is an example diagram illustrating Transmission Control Protocol (TCP) pre-connections per domain name, according to embodiments as disclosed herein. Embodiments herein allow the TPC unit 504 to reduce the TCP connect time. The TPC unit 504 monitors the IP addresses (the DNS responses) received by the DNS yielder unit 502 and identifies the TCP connections per domain name. Further, the TPC unit 504 sends a connect call to the kernel to pre-connect the identified TCP connections of the application with the TCP server(s) 404. Also, the TPC unit 504 creates the connection pool to store information about the pre-connected TCP connections with the TCP server(s).

FIG. 13*b* is an example diagram illustrating operations of the TCP pre-connecting unit (TPC unit) 504, according to embodiments as disclosed herein. As illustrated in FIG. 13*b*, on receiving the TCP connection request from the application, the TPC unit 504 intercepts the TCP connection request and checks the connection pool. The TPC unit 504 maps the TCP connection request with the pre-connected TCP connection stored in the connection pool when the requested TCP request matches with the pre-connected TCP connection. Thus, providing the zero RTT TCP connection to the application.

If the requested TCP connection is not present in the connection pool, the TPC unit 504 sends a connection miss command to the kernel to establish the requested TCP connection with the TCP server(s) 404. The kernel further establishes the requested TCP connection by communicating with the TCP server(s) 404 through the network 108 (for example the Internet). After establishing the requested TCP connection with the TCP server(s) 404, the TPC unit 504 updates information about the established requested TCP connection in the connection pool.

FIG. 13*c* is an example diagram illustrates structure of the connection pool, according to embodiments as disclosed herein. The connection pool includes information about the pre-connected TCP connections with the TCP server(s) 404. The information includes the socket descriptor, the IP address and the port number.

FIG. 13*d* is an example diagram illustrating mapping of the application request with the information of the connection pool, according to embodiments as disclosed herein. As illustrated in FIG. 13*d*, the TPC unit 504 may receive the TCP connection request from the application. The TCP connection request may include a socket descriptor (socketfd-200), an IP address (52.69.189.25) and a port number (80). The TPC unit 504 checks whether the requested TCP connection exists in the connection pool. When the IP address and the port number associated with the requested TCP connection matches with any one of the IP addresses and the port numbers of the connection pool, the TPC unit 504 then maps the socket descriptor of the application with the socket descriptor associated with the matched IP address and the port number of the connection pool. Thus, reducing the TCP connect time.

FIG. 14*a* and FIG. 14*b* are example sequences illustrating handling of TCP connections for reducing TCP connect time, according to embodiments disclosed herein.

FIG. 14*a* is an example sequence illustrating on-load TCP connection handling. The TPC unit 504 may classify the TCP connections into on-load TCP connections and on-demand TCP connections. The on-load TCP connections can be required at the time of application launch. The TPC unit 504 groups the on-load TCP connections which may be created per domain name and stores the grouped on-load TCP connections in the connection pool. On receiving a request from the application for the on-load TCP connections, the TPC unit 504 provides the established on-load TCP connection from the connection pool to the application. As illustrated in FIG. 14*a*, the on-load TCP connections may create an idle time between the TCP 3-way handshake (TCP connection) and a request triggered by the application. However, the TPC unit 504 may provide the zero RTT TCP connection to the application even though the on-load TCP connections create the idle time for the TCP connection.

FIG. 14*b* is an example sequence illustrating on-demand TCP connection handling. The on-demand TCP connections can be the TCP connections required only at application active time.

On request basis of the application, the TPC unit 504 may create the on-demand TCP connections in the connection pool. The on-demand TCP connections exist in the connection pool for a shorter duration of time as compared to the on-demand TCP connections. As illustrated in FIG. 14*b*, the on-demand TCP connections always provide a TCP acknowledge with the TCP connection request triggered by the application and saves at least 0.5 RTT to the TCP server 404.

FIG. 15 is an example flow diagram illustrating a method for pre-connecting an application with TCP server(s) 404, according to embodiments as disclosed herein. As illustrated in FIG. 15, once the application is launched, the TPC unit 504 triggers the TCP connections recognized from the feeder. The feeder may include the domain name stored during the DNS query resolution and the TCP connections associated with the domain name. After triggering the TCP connections, the TPC unit 504 stores the socket descriptor associated with the triggered TCP connections in the connection pool.

Further, after launching the application, the TPC unit 504 monitors a TCP connection request triggered by the application. The TPC unit 504 then checks whether the requested TCP connection exists in the connection pool or not. If the required TCP connection exists in the connection pool, then the TPC unit 504 maps the socket descriptor associated with the requested TCP connection with the socket descriptor of matched TCP connection present in the connection pool. Further, in response to determining that the requested TCP connection does not exist in the connection pool, the TPC unit 504 may trigger the requested TCP connection. Also, the TPC unit 504 updates information about the requested TCP connection in the feeder.

FIGS. 16*a*, 16*b* and 16*c* depict operations of the SSO unit 506, according to embodiments as disclosed herein FIG. 16*a* is an example diagram illustrating operations of a Secure Session Off-loader (SSO) unit, according to embodiments as disclosed herein. As illustrated in FIG. 16*a*, after pre-connecting the application with the TCP server(s) 404, the TPC unit 504 sends a SSO signal to the SSO unit 506 for exchanging the secure certificates. On receiving the SSO signal from the TPC unit 504, the SSO unit 506 may send a SSL negotiation command to the kernel. The kernel exchanges the secure certificates with the TCP server(s) 404 through the network 108 (the Internet). Further, the SSO unit 506 creates the certificate pool to store the secure certificates which are exchanged with the TCP server(s) 404. The secure certificate can be exchanged ahead of the application request time.

FIG. 16*b* is an example diagram illustrating structure of the certificate pool, according to embodiments as disclosed herein. The certificate pool includes information such as the secure certificate, the IP addresses and the port numbers for each pre-connected TCP connection. The information about the secure certificates can be included in the certificate pool along with the socket descriptors of the pre-connected TCP connections as references.

FIG. 16*c* is an example diagram illustrating mapping of the application request with the information of the certificate pool, according to embodiments as disclosed herein. As illustrated in FIG. 16*c*, the SSO unit 506 may receive a request from the application for exchanging the secure certificates. The request may include a socket descriptor (200), an IP address (163.53.78.51) and a port number (43). The SSO unit 506 may check for existence of the socket descriptor (200) reference associated with the request in the certificate pool. If the socket descriptor of the request exists in the certificate pool, the SSO unit 506 may map the secure certificate associated with the socket descriptor reference to the request. Thus, reducing the connectivity overhead provided by the network protocols.

FIG. 17*a* and FIG. 17*b* are example sequence diagrams illustrating comparison of Secure Socket Layer (SSL)/Transport Layer Security (TLS) certificates negotiations performed according to existing techniques and by a Layer 4 accelerator engine, according to embodiments as disclosed herein. In the existing techniques, once the TCP connection is established with the server (involving 1RTT), the secure certificates may be exchanged between the application and the server for making the TCP connection secure. Exchanging the SSL/TLS certificates may consume two RTTs. Thus, the socket setup time includes 3RTTs before sending the first byte to the server as illustrated in FIG. 18*a*.

As illustrated in FIG. 18*b*, Embodiments herein exchanges the SSL/TLS certificate (the secure certificate) with the TCP server 404 only when the application and the TCP server 404 agree on a cipher suite that is available on both environments. Thereby, the application can prefer and set the cipher suite for the secure certificate (the SSL/TLS) negotiation. Further, the SSO unit 506 may recognize the cipher suite preferred by the application and sets the cipher suite during the application launch. Thereafter, the SSO unit 506 sends a 'client hello' message of the SSL protocol along with the preferred cipher suite to the TCP server 404. The TCP server 404 may send the 'server hello' message to the SSO unit 506. On receiving the 'server hello' message, the SSO unit 506 sends a client key exchange message to the TCP server(s) 404 along with a change cypher spec message for exchanging the SSL/TLS certificate. On receiving the client key exchange message, the TCP server may send the cypher spec message to the SSO unit 506. Thus, the SSO unit 506 performs SSL handshake in ahead of the application request time and offloads the overhead on behalf of the application.

FIG. 18 is an example flow diagram illustrating a method for reducing secure certificate exchange time, according to embodiments as disclosed herein. As illustrated in FIG. 13, once the application is launched, the SSO unit 506 triggers secure connections recognized from the feeder. The feeder may include the domain name stored during the DNS query resolution and the secure connections (the TCP connections) associated with the domain name. After triggering the secure connections, the SSO unit 506 creates the certificate pool to store the secure certificates which are exchanged with the TCP server(s) 404 to secure the TCP connections.

Further, after launching the application, the SSO unit 506 monitors a secure connection request triggered by the application. The SSO unit 506 then checks whether the secure certificates required for securing the TCP connections exist in the certificate pool or not. If the required secure certificates exist in the certificate pool, then the SSO unit 506 maps the secure certificate from the certificate pool with the secure connection request. Further, in response to determining that the requested secure certificate does not exist in the certificate pool, the SSO unit 506 may trigger the requested secure connections to create the secure session between the application and the TCP server(s) 404. Also, the SSO unit 506 updates information about the created secure session in the feeder.

FIGS. 19*a* and 19*b* depict example scenarios, wherein the latency caused by the network protocols can be reduced to provide zero connectivity overhead for the applications. For example, the video streaming applications are shown in FIGS. 19*a* and 19*b*. Once the applications are launched or whenever a client opens the applications, the L4 accelerator engine 410 performs the DNS lookup before receiving the DNS queries from the applications for the DNS resolution. Further, the L4 accelerator engine 410 pre-connects the TCP applications with the TCP server(s) 404 before receiving the TCP connection requests from the applications. Further, the L4 accelerator engine 410 exchanges the SSL/TLS certificates with the TCP server(s) 404 before receiving the requests from the applications for the secure certificate negotiation.

As the DNS lookup, the TCP connections and the SSL/TLS certificates exchange are performed ahead of the application request time, the page related to the video list can be downloaded without any delay whenever the client searches for the video list. Similarly, the videos can played without any delay on receiving the request from the client for playing the videos. Thus, resulting in a better user experience.

The embodiments disclosed herein can be implemented through at least one software program running on at least one hardware device and performing network management functions to control the elements. The elements shown in FIG. 4 and FIG. 5 can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

The invention claimed is:

1. A method for reducing network protocol latency for at least one application on a device, the method comprising:
identifying a plurality of first domain name system (DNS) queries triggered by a first application and a plurality of second DNS queries triggered by a second application a number of times which is equal to or greater than a threshold during a predetermined period;
caching the plurality of first DNS queries and a plurality of first DNS responses fetched for the plurality of first DNS queries, and the plurality of second DNS queries and a plurality of second DNS responses fetched for the plurality of second DNS queries from a DNS server;
grouping a plurality of domain names related to the plurality of first DNS queries and the plurality of second DNS queries with a same IP address and a same DNS alias name as a single domain;
identifying a third DNS query triggered by the first application to resolve at least one domain name;
comparing the third DNS query with the cached plurality of first DNS queries related to the first application;
determining whether the second DNS query is included in the plurality of first DNS queries; and
providing the cached plurality of first DNS responses in response to determining the second DNS query is included in the plurality of first DNS queries.

2. The method of claim 1, further comprising:
pre-connecting, by a transmission control protocol (TCP) pre-connecting (TPC) unit, the first application with at least one TCP server,
wherein the first application is pre-connected with the at least one TCP server before receiving at least one TCP connection request from the first application.

3. The method of claim 2, wherein pre-connecting the first application with at least one TCP server comprises:
recognizing a plurality of IP addresses for identifying a plurality of TCP connections associated with the first application;
pre-connecting the plurality of TCP connections with the at least one TCP server;
creating a connection pool to store information about the plurality of TCP connections pre-connected with the at least one TCP server,
wherein the connection pool includes a socket descriptor, an IP address and a port number for each TCP connection pre-connected with the TCP server;
receiving the at least one request from the first application for the at least one TCP connection;
acquiring the at least one TCP connection pre-connected with the at least one TCP server from the connection pool in response to determining the at least one TCP connection requested by the first application exists in the connection pool; and
mapping the at least one TCP connection pre-connected with the at least one TCP server with the at least one request received from the first application for the at least one TCP connection.

4. The method of claim 1, further comprising:
exchanging, by a secure session off-loader (SSO) unit, a plurality of secure certificates with at least one transmission control protocol (TCP) server for establishing a secure session,
wherein the plurality of secure certificates are exchanged before receiving at least one request from the first application for secure certificate negotiation.

5. The method of claim 4, wherein exchanging the plurality of secure certificates with the at least one TCP server includes:
pre-connecting a plurality of TCP connections with the at least one TCP server;
receiving a signal from a TPC unit to exchange the plurality of secure certificates with the at least one TCP server to secure the plurality of TCP connections pre-connected with the at least one TCP server;
exchanging the plurality of secure certificates with the TCP server by obtaining information about a plurality of sockets associated with the plurality of TCP connections pre-connected with the at least one TCP server;
creating a certificate pool to store the information about the plurality of secure certificates exchanged with the TCP server,
wherein the certificate pool includes a secure certificate, an IP address and a port number;
receiving the at least one request from the first application for exchanging at least one secure certificate with the TCP server;
acquiring the at least one secure certificate exchanged with the TCP server from the certificate pool in response to determining the at least one secure certificate requested by the at least one application exists in the certificate pool; and
mapping the at least one secure certificate exchanged with the TCP server with the at least one request received from the first application for exchanging the plurality of secure certificates.

6. The method of claim 5, wherein identifying the plurality of first DNS queries, pre-connecting with the at least one TCP server and exchanging the plurality of secure certificates before an application request reduces the network protocol latency for the first application.

7. A device for reducing network protocol latency for at least one application installed on the device, wherein the device comprises:
a transceiver; and
at least one processor coupled to the transceiver,
wherein the at least one processor is configured to:
identify a plurality of first domain name system (DNS) queries triggered by a first application and a plurality of second DNS queries triggered by a second application a number of times which is equal to or greater than a threshold number during a predetermined period,
cache the plurality of first DNS queries and a plurality of first DNS responses fetched for the plurality of first DNS queries, and the plurality of second DNS queries and a plurality of second DNS responses fetched for the plurality of second DNS queries from a DNS server,
group a plurality of domain names related to the plurality of first DNS queries and the plurality of second DNS queries with a same IP address and a same DNS alias name as a single domain, identify a third DNS query triggered by the first application to resolve at least one domain name,
compare the third DNS query with the cached plurality of first DNS queries related to the first application,
determine whether the second DNS query is included in the plurality of first DNS queries, and
provide the cached plurality of first DNS responses in response to determining the second DNS query is included in the plurality of first DNS queries.

8. The device of claim 7, wherein the at least one processor is configured to control to pre-connect the first application with at least one transmission control protocol (TCP) server before receiving at least one TCP connection request from the first application.

9. The device of claim 8, wherein the at least one processor is further configured to:
recognize a plurality of IP addresses for identifying a plurality of TCP connections associated with the first application,
control to pre-connect the plurality of TCP connections with the at least one TCP server,
create a connection pool to store information in a memory about the plurality of TCP connections pre-connected with the at least one TCP server,
wherein the connection pool includes a socket descriptor, an IP address and a port number for each TCP connection pre-connected with the TCP server,
receive the at least one TCP connection request from the first application for at least one TCP connection,
acquire the at least one TCP connection pre-connected with the at least one TCP server from the connection pool in response to determining the at least one TCP connection requested by the first application exists in the connection pool; and
map the at least one TCP connection pre-connected with the at least one TCP server with the at least one TCP connection request received from the first application for the at least one TCP connection.

10. The device of claim 7,
wherein the at least one processor is configured to control to exchange a plurality of secure certificates with at least one TCP server for establishing a secure session,
wherein the plurality of secure certificates are exchanged before receiving at least one request from the first application for secure certificate negotiation.

11. The device of claim 10, wherein the at least one processor is further configured to:
pre-connect a plurality of TCP connections with the at least one TCP server;
receive a signal for exchanging the plurality of secure certificates with the at least one TCP server to secure the plurality of TCP connections pre-connected with the at least one TCP server;
control to exchange the plurality of secure certificates with the TCP server by obtaining information about a plurality of sockets associated with the plurality of TCP connections pre-connected with the at least one TCP server;
create a certificate pool to store the information about the plurality of secure certificates exchanged with the TCP server,
wherein the certificate pool includes a secure certificate, an IP address and a port number;
receive the at least one request from the first application for exchanging at least one secure certificate with the TCP server;
acquire the at least one secure certificate exchanged with the TCP server from the certificate pool in response to determining the at least one secure certificate requested by the at least one application exists in the certificate pool; and
map the at least one secure certificate exchanged with the TCP server with the at least one request received from the at least one application for exchanging the at least one secure certificate,
wherein identifying the plurality of first DNS queries comprises pre-connecting with the TCP server and exchanging the plurality of secure certificates before an application request reduces the network protocol latency for the first application.

\* \* \* \* \*